US012793493B2

(12) United States Patent
Shankar et al.

(10) Patent No.: US 12,793,493 B2
(45) Date of Patent: Nov. 10, 2026

(54) ADVANCED ACCESS CONTROL USING BIOMETRIC DATA

(71) Applicant: Oshkosh Corporation, Oshkosh, WI (US)

(72) Inventors: Prabhu Shankar, Oshkosh, WI (US); Shane Mastronardi, Oshkosh, WI (US); Julien J. Schrenk, Oshkosh, WI (US); David Lombardo, Oshkosh, WI (US); Matthew Gilbride, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 480 days.

(21) Appl. No.: 17/193,065

(22) Filed: Mar. 5, 2021

(65) Prior Publication Data

US 2021/0279991 A1 Sep. 9, 2021

Related U.S. Application Data

(60) Provisional application No. 62/986,011, filed on Mar. 6, 2020.

(51) Int. Cl.
*G07C 9/37* (2020.01)
*G06F 21/32* (2013.01)
(Continued)

(52) U.S. Cl.
CPC ............... *G07C 9/37* (2020.01); *G06F 21/32* (2013.01); *G06F 21/36* (2013.01); *G07C 9/00896* (2013.01); *G06F 2221/2141* (2013.01)

(58) Field of Classification Search
CPC ....... G07C 9/37; G07C 9/00896; G06F 21/32; G06F 21/36; G06F 2221/2141
See application file for complete search history.

(56) References Cited

U.S. PATENT DOCUMENTS 4,602,150 A * 7/1986 Nishikawa .......... E05B 47/0043 235/382
5,635,901 A * 6/1997 Weinblatt ................ B60R 25/04 340/426.36
(Continued)

FOREIGN PATENT DOCUMENTS

CN 109598858 A * 4/2019 ......... G07F 17/0057
CN 109598858 B * 1/2021 ............. B60R 25/25
(Continued)

*Primary Examiner* — John B King
*Assistant Examiner* — Alex D Carrasquillo
(74) *Attorney, Agent, or Firm* — Foley & Lardner LLP

(57) ABSTRACT

A method for providing access to an operator for a heavy equipment is shown. The method includes receiving equipment data and a first set of operator identification data from the operator, the operator identification data including an identify of the operator. The method includes verifying that the operator identification data can be registered with the equipment data. The method includes registering the identity of the operator with the equipment data such that the operator is registered to operate the heavy equipment. The method includes receiving a second set of operator identification data from the operator at a future time period. The method includes determining that the operator is permitted to operate the heavy equipment based on the second set of operator identification data comprising biometric data that is indicative of the identity of the operator.

20 Claims, 16 Drawing Sheets

(51) Int. Cl.
*G06F 21/36* (2013.01)
*G07C 9/00* (2020.01)

(56) References Cited

U.S. PATENT DOCUMENTS

| | | | | |
|---|---|---|---|---|
| 7,474,060 | B2 * | 1/2009 | Takeuchi | G09G 3/22 315/169.3 |
| 7,486,170 | B2 * | 2/2009 | Kimura | B60R 25/24 340/5.1 |
| 7,876,201 | B2 * | 1/2011 | Bauchot | B60R 25/2018 340/5.1 |
| 8,371,214 | B1 * | 2/2013 | Correale, Jr. | F16P 3/08 100/48 |
| 8,514,055 | B2 * | 8/2013 | Ishikawa | B60L 15/20 340/5.1 |
| 10,457,533 | B2 | 10/2019 | Puszkiewicz et al. | |
| 10,482,226 | B1 * | 11/2019 | Konrardy | B60W 10/04 |
| 10,498,727 | B1 * | 12/2019 | Sherif | H04W 12/02 |
| 10,781,090 | B2 | 9/2020 | Puszkiewicz et al. | |
| D899,452 | S | 10/2020 | Klimes et al. | |
| 10,831,859 | B2 * | 11/2020 | Van Wiemeersch | G06Q 30/0645 |
| D910,670 | S | 2/2021 | Klimes et al. | |
| 11,014,796 | B2 | 5/2021 | Bafile et al. | |
| 2003/0163710 | A1 * | 8/2003 | Ortiz | H04L 63/0861 713/186 |
| 2004/0169076 | A1 * | 9/2004 | Beale | G07C 9/257 235/382 |
| 2005/0156028 | A1 * | 7/2005 | Chirnomas | G07F 9/002 235/381 |
| 2007/0126560 | A1 * | 6/2007 | Seymour | B60R 25/252 180/287 |
| 2009/0138953 | A1 * | 5/2009 | Lyon | G07C 9/22 726/9 |
| 2009/0219135 | A1 * | 9/2009 | Harvey | B60R 25/2018 340/5.82 |
| 2011/0078074 | A1 * | 3/2011 | Lipman | G06Q 20/10 705/347 |
| 2015/0084736 | A1 * | 3/2015 | Horton | H04B 5/0056 340/5.7 |
| 2016/0219061 | A1 * | 7/2016 | Walton | H04W 4/80 |
| 2018/0018606 | A1 * | 1/2018 | Love | G06Q 10/06312 |
| 2018/0041506 | A1 * | 2/2018 | Han | G06F 21/32 |
| 2018/0107817 | A1 * | 4/2018 | Brewer | G06F 21/35 |
| 2018/0204399 | A1 * | 7/2018 | Newman | G07C 9/28 |
| 2019/0161060 | A1 * | 5/2019 | Yanagida | B60R 25/241 |
| 2019/0166120 | A1 * | 5/2019 | Goenka | G08B 13/22 |
| 2020/0019635 | A1 * | 1/2020 | Poirel | G06F 16/24568 |
| 2020/0317065 | A1 | 10/2020 | Lombardo | |
| 2020/0317256 | A1 | 10/2020 | Hao et al. | |
| 2020/0317480 | A1 | 10/2020 | Shankar et al. | |
| 2020/0317488 | A1 | 10/2020 | Bafile et al. | |
| 2020/0317493 | A1 | 10/2020 | Lombardo et al. | |
| 2021/0002112 | A1 | 1/2021 | Puszkiewicz et al. | |
| 2021/0049385 | A1 * | 2/2021 | Pinto | B60R 16/037 |

FOREIGN PATENT DOCUMENTS

| | | | | |
|---|---|---|---|---|
| JP | 2005166064 | A | * | 6/2005 |
| JP | 2013150233 | A | * | 8/2013 |

* cited by examiner

700

900

1000

ADVANCED ACCESS CONTROL USING BIOMETRIC DATA

CROSS-REFERENCE TO RELATED APPLICATION

This application claims the benefit of and priority to U.S. Provisional Application No. 62/986,011, filed Mar. 6, 2020, which is incorporated herein by reference in its entirety.

BACKGROUND

The present application relates to commercial vehicles. More particularly, the present application relates to access control methods for commercial vehicles.

SUMMARY

One implementation of the present disclosure is a method for providing access to an operator for a heavy equipment. The method includes receiving equipment data and a first set of operator identification data from the operator, the operator identification data including an identify of the operator. The method includes verifying that the operator identification data can be registered with the equipment data. The method includes registering the identity of the operator with the equipment data such that the operator is registered to operate the heavy equipment. The method includes receiving a second set of operator identification data from the operator at a future time period. The method includes determining that the operator is permitted to operate the heavy equipment based on the second set of operator identification data comprising biometric data that is indicative of the identity of the operator.

In some embodiments, the method further includes providing a notification to the operator indicating that the operator is permitted to operate the heavy equipment and unlocking one or more locks on the heavy equipment that prevent operation of the heavy equipment.

In some embodiments, receiving equipment data and the first set of operator identification data from the operator includes receiving a contract number associated with the operation of the heavy equipment, receiving an operator number associated with the employment of the operator, and receiving a first set of facial image data of the operator. In some embodiments, the biometric data is a second set of facial image data of the operator.

In some embodiments, receiving equipment data and the first set of operator identification data from the operator includes receiving the equipment data and the first set of operator identification data via a mobile device of the operator.

In some embodiments, receiving equipment data and the first set of operator identification data from the operator includes receiving the equipment data via user inputs from the operator on an interface and receiving at least part of the identification data via one or more cameras located proximate to the heavy equipment.

In some embodiments, verifying that the operator identification data can be registered with the equipment data includes querying a database to determine if the operator identification data is valid, in response to determining that the operator identification data is valid, associating the operator identification data with a contractor number.

In some embodiments, the method further includes determining a level of access for the operator using a multi-tiered access structure, the multi-tiered structure including a full access mode, a limited access mode, and a denied access mode. In some embodiments, wherein the multi-tiered access structure performs top-down hierarchy authentication to determine the level of access for the operator.

In some embodiments, determining that the operator is permitted to operate the heavy equipment includes determining the identity of the operator based on the biometric data, and in response to determining the identity of the operator, determining if the operator is registered to operate the heavy equipment.

Another implementation of the present disclosure is a non-transitory computer-readable storage media having computer-executable instructions stored thereon that, when executed by one or more processors of a registration system, cause the registration system to perform operations. The operations include receiving equipment data for and a first set of operator identification data from an operator, the operator identification data comprising an identify of the operator. The operations include verifying that the operator identification data can be registered with the equipment data. The operations include registering the identity of the operator with the equipment data such that the operator is registered to operate a heavy equipment. The operations include receiving a second set of operator identification data from the operator at a future time period. The operations include determining that the operator is permitted to operate the heavy equipment based on the second set of operator identification data comprising biometric data that is indicative of the identity of the operator.

In some embodiments, the media further includes providing a notification to the operator indicating that the operator is permitted to operate the heavy equipment and unlocking one or more locks on the heavy equipment that prevent operation of the heavy equipment.

In some embodiments, receiving equipment data and the first set of operator identification data from the operator includes receiving a contract number associated with the operation of the heavy equipment, receiving an operator number associated with the employment of the operator, and receiving a first set of facial image data of the operator. In some embodiments, the biometric data is a second set of facial image data of the operator.

In some embodiments, receiving equipment data and the first set of operator identification data from the operator includes receiving the equipment data and the first set of operator identification data via a mobile device of the operator.

In some embodiments, receiving equipment data and the first set of operator identification data from the operator includes receiving the equipment data via user inputs from the operator on an interface and receiving at least part of the identification data via one or more cameras located proximate to the heavy equipment.

In some embodiments, verifying that the operator identification data can be registered with the equipment data includes querying a database to determine if the operator identification data is valid and, in response to determining that the operator identification data is valid, associating the operator identification data with a contractor number.

In some embodiments, the media further includes determining a level of access for the operator using a multi-tiered access structure, the multi-tiered structure comprising a full access mode, a limited access mode, and a denied access mode. In some embodiments, wherein the multi-tiered access structure performs top-down hierarchy authentication to determine the level of access for the operator.

In some embodiments, determining that the operator is permitted to operate the heavy equipment includes determining the identity of the operator based on the biometric data and, in response to determining the identity of the operator, determining if the operator is registered to operate the heavy equipment.

Another implementation of the present disclosure is an equipment registration system for providing access to an operator. The registration system includes a heavy equipment configured to be operated by an operator and a controller. The controller includes a one or more processors and memory storing instructions that, when executed by the one or more processors, cause the one or more processors to perform operations. The operations include receiving equipment data and a first set of operator identification data from the operator, the operator identification data comprising an identify of the operator, verifying that the operator identification data can be registered with the equipment data, registering the identity of the operator with the equipment data such that the operator is registered to operate the heavy equipment, receiving a second set of operator identification data from the operator at a future time period, and determining that the operator is permitted to operate the heavy equipment based on the second set of operator identification data comprising biometric data that is indicative of the identity of the operator.

In some embodiments, the processing circuit is further configured to provide a notification to the operator indicating that the operator is permitted to operate the heavy equipment and unlock one or more locks on the heavy equipment that prevent operation of the heavy equipment.

In some embodiments, receiving equipment data and the first set of operator identification data from the operator includes receiving a contract number associated with the operation of the heavy equipment, receiving an operator number associated with the employment of the operator, and receiving a first set of facial image data of the operator. In some embodiments, the biometric data is a second set of facial image data of the operator.

In some embodiments, receiving equipment data and the first set of operator identification data from the operator includes receiving the equipment data and the first set of operator identification data via a mobile device of the operator.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1A:
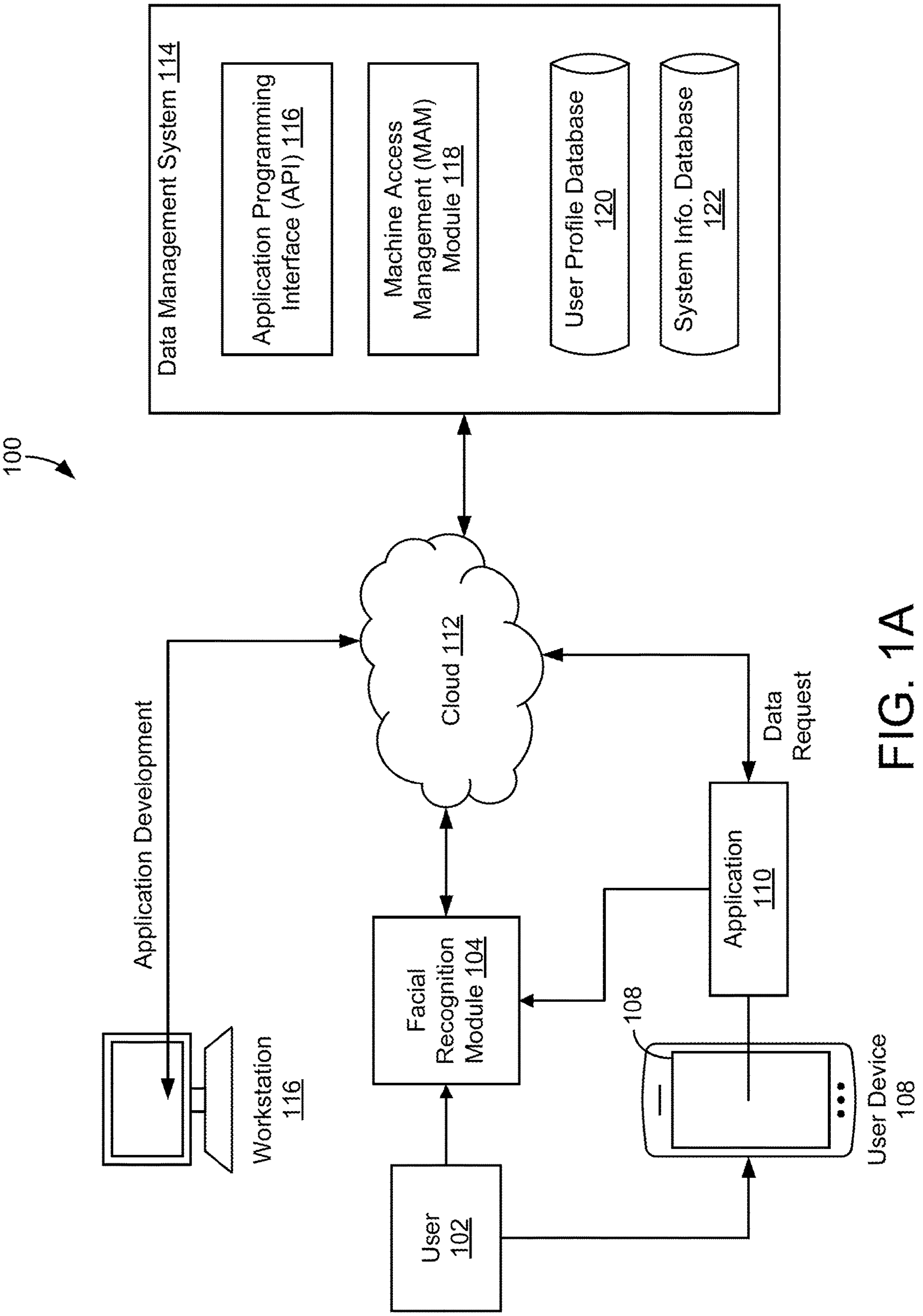
FIG. 1A is a block diagram of an access control system for a commercial vehicle, according to an exemplary embodiment.

The disclosure will become more fully understood from the following detailed description, taken in conjunction with the accompanying figures, wherein like reference numerals refer to like elements.

Overview

Referring generally to the FIGURES, systems and methods for receiving access to various commercial vehicles (e.g., heavy equipment, heavy machinery, etc.) using facial recognition is shown, according to exemplary embodiments. Biometric information (e.g., facial features, fingerprints, etc.) of operators (e.g., construction equipment operators, etc.) may be received and processed via cloud computing to determine whether the operator is allowed access to operate the construction equipment and/or commercial vehicles (e.g., work platforms, telehandlers, scissor lifts, vertical lifts, etc.).

In some embodiments, implementing access control using biometric information is advantageous over typical control methods, such as radio frequency identification (RFID) or keypads. RFID cards can be lost, exchanging RFID cards or PIN codes for keypads between operators can cause accountability and/or security issues, RFID cards may be stolen, and RFID cards/PIN's may be lost or stolen. The various issues described above can lead to a greater security risk for a construction site and result in financial loss due to security/accountability concerns. For contractors, it can place significant stress in tracking the equipment, filing police complaints, insurance claims, replacing equipment at the construction site until the equipment is retrieved by the police, penalties for not completing the contract on time because of loss of these equipment, and increased cost of operation due to increased insurance premium.

In an exemplary embodiment, the systems and methods described herein recognize an operator's face and use biometric information to verify whether the operator is authorized to operate the commercial vehicle or other metrics (e.g., whether the contractor has met their contractual obligations, etc.). These processes may be implemented via cloud and/or edge computing. The system may be accompanied by an application (e.g., iOS application, Android application, etc.) for contractors to add and view certain information. The application may be an "InSys" application. Additionally, an application programming interface (API) may be provided to customers (e.g., operators, contractors, general contractors, etc.) to build their own applications and access data from the cloud.

In exemplary embodiments, two methods of access control are available: (i) Phone based Access (PA); (ii) Hardware Integrated Access (HIA). In some embodiments, either of these methods allow an operator to register their biometric ID (Identification) and/or request for access. The system may be designed with contractors being the central piece of information. As and when a contractor rents equipment, a contract identification number may be generated in the cloud, and it will be available in the InSys app or it can be accessed via the API. Each operator, hired by the contractor, may be provided with this contract number. Additionally, every operator who is trained to operate the commercial equipment will be provided with a training identification number from a training system, which is also accessible by the cloud. With these two sets of information, an operator can be ready to register their biometric ID using PA or the HIA method. In exemplary embodiments, the systems and methods disclosed herein may be advantageous when compared to other systems and methods for providing access control for commercial vehicles.

For example, equipment users willing to use advanced access control (AAC) may have to register their face to extract biometric ID. Using this ID, users will be verified when attempts are made to use the equipment. Multiple users may want to use the same equipment and as a result, a feature to register multiple operators and subsequently verify them may be necessary. Embodiments to support such requirements are designed and integrated, both in terms of hardware and software, within the access equipment. For example, in the case of telehandler, it is seamlessly integrated in the dashboard, header, and C-pillar of a commercial vehicle.

In another example, access equipment are owned by large rental companies, and they are rented out to contractors undertaking construction projects. They may hire skilled and trained users to operate the equipment at the construction site. This equipment will also be used by salesman for demonstration purpose and by service technicians for maintenance and repair. Therefore, the AAC system should allow access to the equipment based on the type of user who is requesting access and based on the circumstance. To support such a complex requirement, the AAC system includes a method to register users on-board from within the access equipment. It is not required for any type of users to travel to a different location for biometric registration. Such level of multi-level authorization for multiusers, for smartphone devices (e.g., iPhone, etc.) are not required as it is predominantly used only by the owner who purchases the device.

In another example, unauthorized users operating an equipment could lead to a high financial liability for the contractor. Unauthorized users may cause a property damage, cause a bodily injury to themselves and to the people at construction site that may even result in a loss of life. Thus, preventing unauthorized users from operating an access equipment is critical. The AAC system has a unique way of verifying if an operator is trained by checking their training credentials, and if an operator can operate a specific equipment at the construction site.

In another example, contract agreement for an access equipment can either be fixed and/or floating. Fixed contract, as described herein, may mean one contractor renting an equipment for a fixed time while a floating contract means two or more contractors renting a same equipment on a time-sharing basis. In a floating contract embodiment, each of those contractors will hire different operators to operate the same machine. The AAC system is designed to identify if a user is authorized, and concurrently, determine the type of contract using unique identifiers using which authorization level will be determined. Such degree of complexity is advantageous and distinct from other devices (e.g., iPhone, etc.) as contract method is fixed (e.g., a user contracts a phone for a period of two years, etc.).

As described herein, commercial vehicles and commercial equipment can include any and all machines, vehicles, lifts, and equipment configured to operate in a commercial setting or construction site. These may include but is not limited to refuse vehicles, trucks, end loaders, engine powered boom lifts, electric boom lifts, hybrid boom lifts, low-level access lifts, vertical lifts, stock pickers, scissor lifts, carriers, telehandlers, and towable boom lifts. Commercial vehicles that do not have an enclosure (e.g., vertical lift, etc.) may still include various facial recognition modules/processing for access control.

Facial Recognition System

System Overview

Referring now to FIG. 1, a system 100 (e.g., the Advanced Access Control system, the AAC system, etc.) for performing facial recognition to provide access to operators for operation of a commercial vehicle is shown, according to some embodiments. In some embodiments, system 100 is a subsystem of a heavy equipment management system that includes various user devices, computer applications, machinery, heavy equipment, cloud services, and other components. System 100 is shown to include user 102, facial recognition module device 104, workstation 106, user device 108, application 110, cloud 112, and data management system 114.

User 102 may include any individual capable of engaging with system 100. In an exemplary embodiment, user 102 is a commercial vehicle operator (e.g., laborer, technician, operator, etc.) responsible for operating a commercial vehicle. User 102 can also include contractors or managers for a construction site. In an exemplary embodiment, user 102 is an operator known to data management system 114, such that data management system 114 has known credentials (e.g., operator ID, company ID, registration information, name, etc.) for the operator. User 102 is shown to interact (e.g., use, click on, engage with) user device 108.

Facial recognition module device 104 may be configured to recognize the facial features of user 102 and provide information to data management system 114 based on the recognized facial features. Facial recognition module device 104 may be able to detect the identity of various users 102 by analyzing numerous (e.g., 50, 100, etc.) factors of a face, such as the depth of eye sockets, height of the cheekbones, and the shape of the jawline. In an exemplary embodiment, facial recognition module device 104 may map two-dimensional (2D) images of user 102 into a three-dimensional (3D) model to determine a model of what user 102 looks like from different angles. Facial recognition module device 104 may determine a faceprint for several users 102 and provide the faceprint information to data management system 114 for processing and storage. This processing may include adding the faceprint of user 102 to the profile of 102, such that when user 102 attempts to access a commercial vehicle equipped with facial recognition module device 104, facial recognition module device 104 can determine whether that faceprint recognized presently matches the faceprint stored in the profile of user 102 to determine if the user 102 is the same user 102 stored in the profile.

Workstation 106 may be one or more computers capable of developing software and/or applications for system 100. Workstation 106 may be a desktop computer, laptop, tablet, phone, or other device. In some embodiments, workstation 106 is connected to cloud 112 via a building network. Workstation 106 may include processing circuitry that allows it to build a custom software application using information from data management system 114, by pining (e.g., using, etc.) application programming interface (API) 116 of data management system 114.

User device 108 can be any device capable of receiving and displaying application 110 and allowing interaction with application via a user interface. In an exemplary embodiment, user device 108 is a smartphone. In other embodiments, user device 108 is a tablet, computer, laptop, or other device. User device 108 is shown to be operated by user 102 and engage with application 110. In an exemplary embodiment, the hosting of application is performed in data management system 114, and the application 110 is provided to user device 108 via a download (e.g., a download over cloud 112, etc.). User device 108 may display application 110 on the interface of user device 108. User device may be housed within the cab of a commercial vehicle (e.g., fastened tablet, etc.) or act as a personal portable user device (e.g., smartphone, etc.).

Application 110 can be any computer program designed for facilitating the processes disclosed herein and capable of running on user device 108. In an exemplary embodiment, application 110 is a phone application (e.g., phone app, app, etc.) downloaded from an application store (e.g., Google Play, Apple Store, etc.). Application 110 may be hosted off-premise (e.g., within a server at a different location) and accessed via a cloud, as shown in FIG. 1. In other embodiments, application 110 is utilizes edge computing and is hosted locally or internally (e.g., within a processing circuit that also performs facial recognition). In such an embodiment, a single processing device may host, process, and interface with user 102 without accessing the cloud. In various embodiments, edge computing and cloud computing are used in combination to implement application 110.

In an exemplary embodiment, application 110 is configured to receive registration information from user 102. User 102 may need to provide his/her personal information (e.g., name, address, employee ID, etc.) to application 102, such that application 102 can provide the information to data management system 114 for database storage and to develop a profile for user 102. Application 110 may be configured to display the profiles of users on an interface, such as the interface disclosed with reference to FIG. 11 below. Application 110 may also be configured to receive information from data management system 114 relating to the equipment, operation, or overall processes of system 100.

In an exemplary embodiment, user 102 may capture their image via a camera on user device 108 and provide the image to data management system 114. Data management system 114 can then provide the image to facial recognition module device 104 for processing and determining access to control vehicles. As such, user 102 does not need to be directly proximate to facial recognition module device 104 to provide a faceprint to system 100. In other embodiments, facial recognition module device 104 includes a communications interface that allows user 102 to provide an image to facial recognition module device 104 directly.

In an exemplary embodiment, a user needs to register for application 110, such that he/she may have access to operate a commercial vehicle construction company. The user downloads the construction company application from an app store (e.g., downloads application 110 from an app store onto user device 108), and application 110 prompts the user to provide his/her employee information. The user inputs name, employee ID, company name, and telephone number into application 110. Application 110 sends that information to data management system 114 and a profile is generated for the user. The user is then instructed to provide a faceprint for system 100, and stands proximate to facial recognition module device 104 to have a faceprint determined. Facial recognition module device 104 sends the faceprint to data management system 114 and the faceprint is added to the profile for the user. The user may now attempt to use a commercial equipment equipped with facial recognition module device 104 to determine if they are allowed access to operate the equipment.

Cloud 112 may be configured to use a network of remote servers hosted on interconnected networks (e.g., the Internet) to store, manage, and process data, rather than a local server or a personal computer. In an exemplary embodiment, user 102, facial recognition module device 104, smart device 108 and workstation 106 are located on-site at a construction site, while data management system 113 is located at a different location (e.g., 50 miles away, 100 miles away, etc.). The wired or wireless connections between these two locations in system 100 may be performed via cloud 112 through a series of interconnected networks. In some embodiments, data management system 114 is provided locally on-site and a cloud network is not needed (not shown in FIG. 1).

Data management system 114 may be configured to manage the operator profiles, user information, faceprints, and access criteria within system 100. Data management system 114 and the various components therein may be stored and processed within one or more servers located in a data center or server building. Data management system 114 is shown to include API 116, machine access management (MAM) module 118, user profile database 120, and system information database 122.

API 116 may be an application programming interface configured to allow workstation 106 to receive information stored in data management system 114 and facilitate transmission of that information to workstation 106. MAM 118 may include processing circuitry configured to manage system 100. In an exemplary embodiment, MAM 118 facilitates the data exchange between databases 120, 122 to facial recognition module device 104 and/or application 110. User profile database 120 may be configured to store information relating the user profiles. System information database 122 may be configured to store information relating to system information. This may include the number of total operators with access, the number of total operators without access, current number of operators using the equipment, and other system-wide information. Databases 120,122 may be part of the same database and may be stored on one or more severs within data management system 114. Greater detail regarding data management system 114, particularly MAM module 118, is described in greater detail below with reference to FIG. 8.

User-Device Schema

Figure 1B:
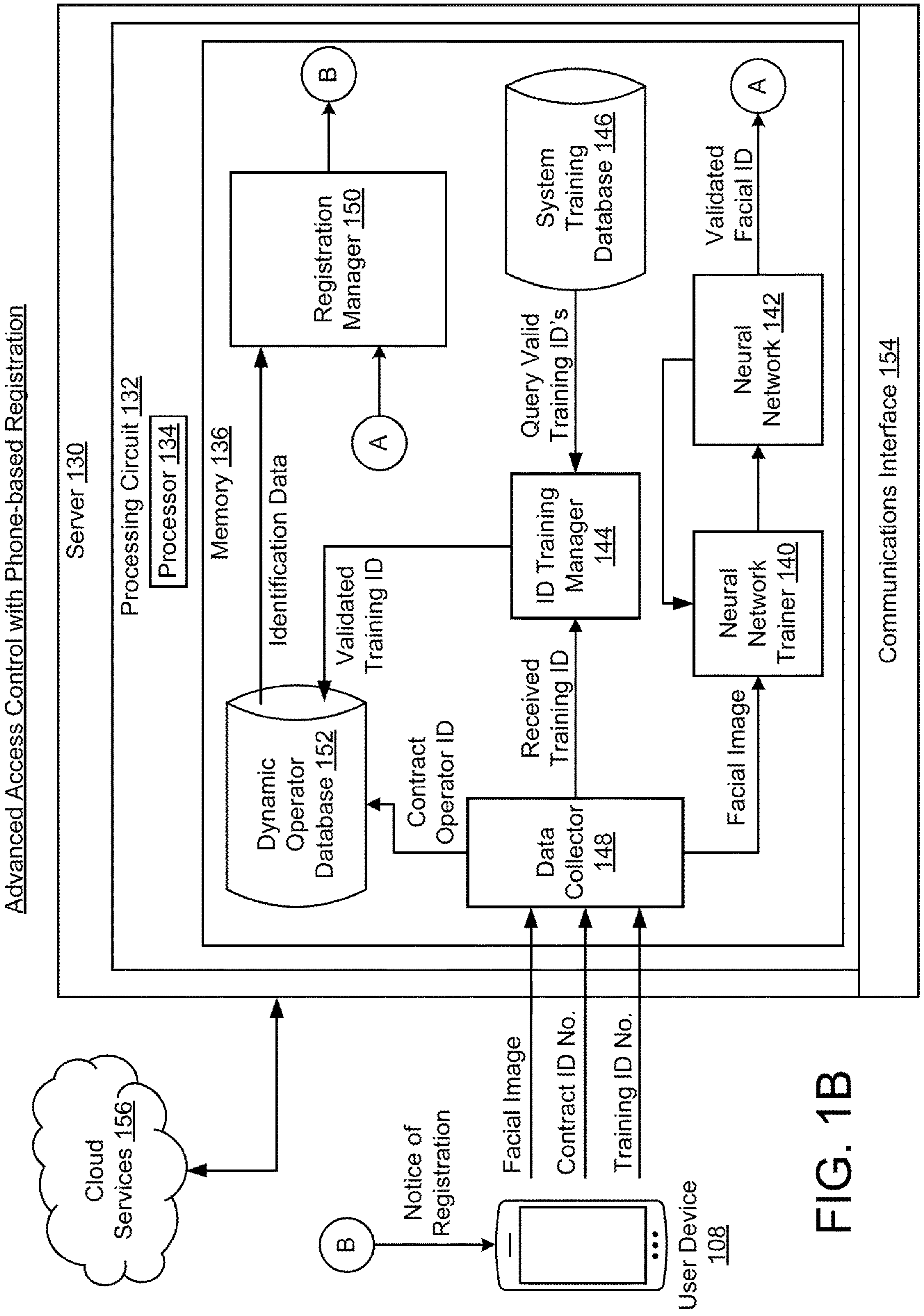
FIG. 1B is a block diagram of a server which can be implemented in the system of FIG. 1A, according to an exemplary embodiment.

Referring now to FIG. 1B, another embodiment of server 130 is shown, according to some embodiments. Server 130 may be configured to receive data from user device 108 and perform one or more operations that grant permission to an operator via a registration process. While server 130 may generally be considered an off-premise cloud server, server 130 can be any type of processing device, including a controller, a workstation, a laptop, a tablet, or a smartphone. In some embodiments, the processing circuitry of server 130 is distributed across multiple devices.

Server 130 is shown to include processing circuit 132 including processor 134 and memory 136, and communications interface 154. Processing circuit 132 can be communicably connected to communications interface 154 such that processing circuit 132 and the various components thereof can send and receive data via communications interface 154. Processor 134 can be implemented as a general purpose processor, an application-specific integrated circuit (ASIC), one or more field-programmable gate arrays (FPGAs), a group of processing components, or other suitable electronic processing components.

Memory 136 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 136 can be or include volatile memory or non-volatile memory. Memory 136 can include database components, object code components, script components, or any other type of information structure for supporting the various activities and information structures described in the present application. According to an exemplary embodiment, memory 136 is communicably connected to processor 134 via processing circuit 132 and includes computer code for executing (e.g., by processing circuit 132 and/or processor 134) one or more processes described herein.

In some embodiments, server 130 is implemented within a single computer (e.g., one server, one housing, etc.). In various other embodiments server 130 can be distributed across multiple servers or computers (e.g., that can exist in distributed locations). Further, while FIG. 1B shows cloud services 156 as existing outside of server 130, in some embodiments, cloud services 156 can be hosted within server 130 (e.g., within memory 136).

Communications interface 154 can facilitate communications between server 130 and external applications (e.g., cloud services 156, etc.) for allowing user control, monitoring, and adjustment to server 130, heavy equipment and/or other systems/subsystems. Communications interface 154 can be or include wired or wireless communications interfaces (e.g., jacks, antennas, transmitters, receivers, transceivers, wire terminals, etc.) for conducting data communications with user device 108, cloud services 156, or other external systems or devices. In various embodiments, communications via communications interface 154 can be direct (e.g., local wired or wireless communications) or via a communications network (e.g., a WAN, the Internet, a cellular network, etc.). For example, communications interface 154 can include an Ethernet card and port for sending and receiving data via an Ethernet-based communications link or network. In another example, communications interface 154 can include a Wi-Fi transceiver for communicating via a wireless communications network. Memory 136 is shown to include neural network trainer 140, neural network 142, ID training manager 144, data collector 148, system training database 146, dynamic operator database 152, and registration manager 150.

Data collector 148 may be configured to receive facial image data (e.g., biometric data, fingerprint data, etc.) from user device 108. In some embodiments, an operator wishes to register for a piece of heavy equipment, such that they may be able to operate the equipment. The registration process begins with the operator taking a picture of themselves and providing their training data and/or contract data to server 130. Once received, data collector 148 may provide the received training data (e.g., training identification number, etc.) to ID training manager 144. In some embodiments, server 130 needs to verify that the operators information (e.g., name, employee ID, etc.) which can be included in the training ID data, is actually information that can be registered for the equipment. ID training manager 144 receives the training ID data from data collector 148, along with a collection of valid training ID's to determine if the operator's training ID information can be registered. For example, the training ID information includes a name and an employee number, and the ID training manager 144 queries system training database 146 to determine if the name and employee ID number are found "in the system" (e.g., are logged as being able to be registered with equipment, etc.).

Once the ID training manager 144 determines that the ID information is valid, the validated training information is sent to dynamic operator database 152. Dynamic operator database 152 may be configured to determine if one or more contract numbers are associated with the validated training ID data. This may be done as certain contracting jobs while permit certain operators to use equipment, while others don't. For example, operator A can use equipment S for contract X, but cannot use equipment S for contract Y. Dynamic operator database 152 may be configured to provide all of the validated identification data (e.g., validated training identification information, contract ID information, etc.) to registration manager 150.

Data collector 148 may also be configured to provide facial image data or other biometric data to neural network trainer 140. In some embodiments, neural network trainer 140 is configured to receive historical data to train neural network 142. The training could occur offline, prior to receiving actual facial image data, or the training could occur "on the fly" wherein the real-time facial image data is used as both an input to the model of the neural network 142 and to improve the training of neural network 142. Any time of machine learning may be used to convert the facial image data into an indication of an identified operator or substantial close to determining so. Neural network 142 may include multiple types of machine learning functionality. Neural network 142 is configured to determine a validated identification of an operator based on the facial image. In some embodiments, the facial image data is received during a registration process, so server 130 may be receiving the facial image data of the operator for the first time. As such, the neural network may be configured to remember the facial image data such that future facial image data sets of the operator are able to be identified by neural network 142 as being the operator. Once the neural network 142 has associated an identity with the facial image data, a notice of registration may be provided to user device 108, indicating that registration of the operator to use the equipment has been completed.

Figure 1C:
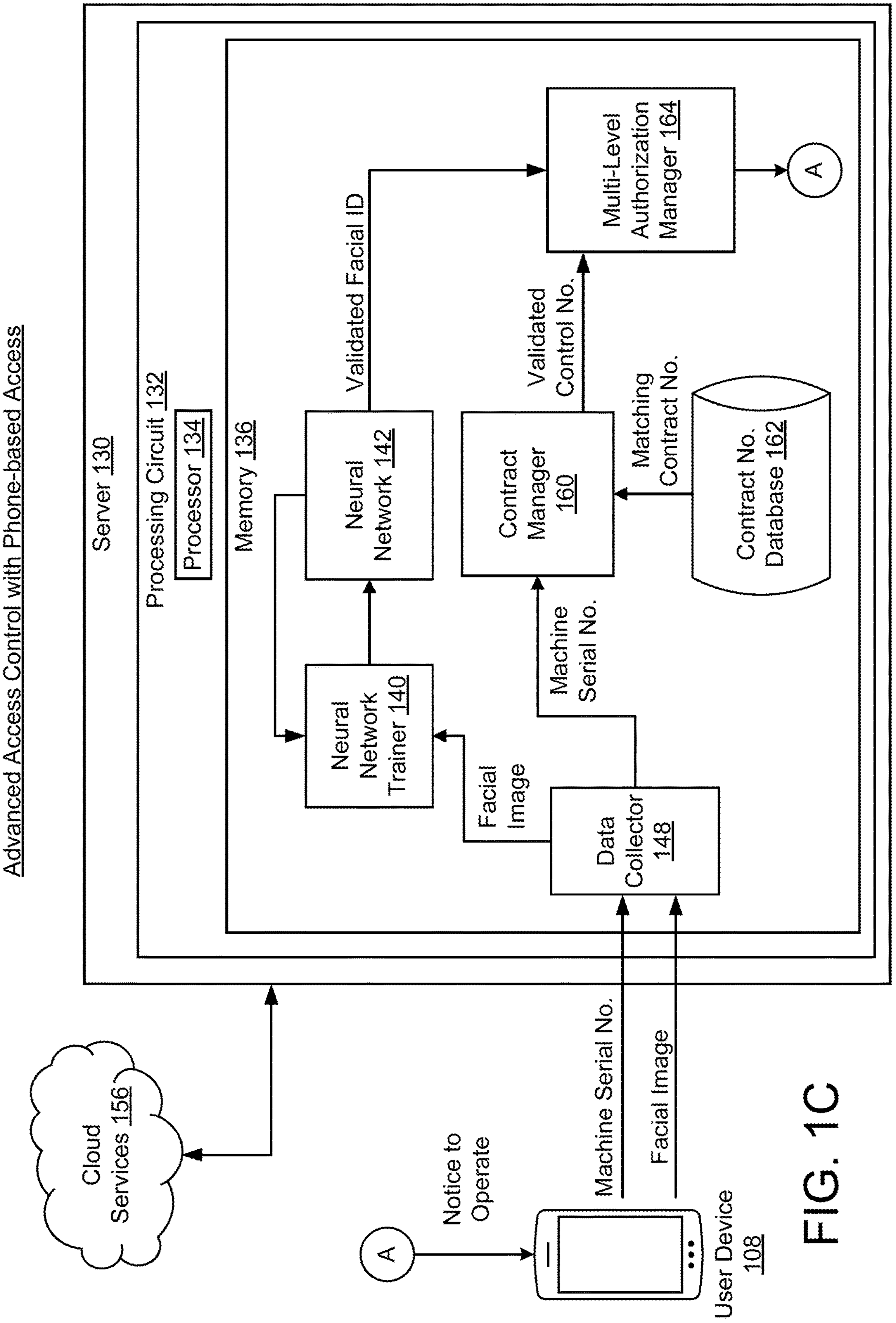
FIG. 1C is a block diagram of a server which can be implemented in the system of FIG. 1A, according to an exemplary embodiment.

Referring now to FIG. 1C, another embodiment of server 130 is shown, according to some embodiments. Server 130 as shown in FIG. 1C may be configured to perform the operations of engaging an operator with the equipment, now that the operator has been registered. The operator may wait a period of time (e.g., 1 hour, 1 day, 1 month, 1 year, etc.) between registering to operate the equipment (e.g., as shown in FIG. 1B) and actually operating the equipment. As shown in FIG. 1C, memory 136 is shown to include data collector 148, neural network trainer 140, neural network 142, contract manager 160, contract number database 162, and multi-level authorization manager 164.

Data collector 148 may be configured to receive facial image data and equipment data (e.g., machine serial number data) from user device 108. In some embodiments, the machine serial number data (or other data indicative of a type, model, or manufacture of a piece of equipment) is received via an optically scanned code, such as a barcode or QR code. Data collector 148 receives the data and provides the equipment data to contract manager 160. Contract manager 160 may be configured to determine whether the received equipment data is authorized to be operated presently or if the operator is authorized to operate the equipment presently. This may be performed by querying contract number database 162 to see the previously stored operator/contract information (e.g., as described above with reference to FIG. 1B) and determining a validated control number that can be provided to multi-level authorization manager 164.

Data collector 148 may also be configured to provide the facial image data to neural network trainer 140. Neural network trainer 140 and neural network 142 may perform similar operations as described above with reference to FIG. 1B. In some embodiments, neural network 142 is now aware of the facial image data of the operator (since they have been registered), and now determines whether the received facial image data from user device 108 is indicative of the same operator as who registered. This may be determined by multi-level authorization manager 164. The neural network 142 determines an identity of an operator (which ideally matches the operator who registered and is attempting to operate the equipment) and provides the identity information to multi-level authorization manager 164.

Multi-level authorization manager 164 may be configured to facilitate the different levels of operation that are permitted for the operator. For example, if the operator is a foreman, he may have more access in terms of operating the equipment compared to an apprentice. Multi-level authorization manager 164 is described in greater detail below with reference to FIG. 8. In some embodiments, diagram 800 is a flow diagram of a process that is implemented by multi-level authorization manager 164. Some or all of the systems and methods described with reference to diagram 800 may be performed by any of the processing components of server 130, such as multi-level authorization manager 164. Once the multi-level authorization manager 164 determines that the operator is registers and has passed the verification process, a notice may be sent to user device 108 indicating such. While not shown, one or more locks on the equipment (e.g., electrical locks, mechanical locks, etc.) may be lifted that prevented unregistered and/or unverified users from operating the equipment.

As shown in FIGS. 1B-1C cloud services 156 are communicably connected to server 130. In some embodiments, server 130 is located within the cloud off-premise. In other embodiments, server 130 is located proximate the equipment but communicably connects to cloud services 156. Cloud services 156 may be partially or entirely included within cloud 112.

Figure 1D:
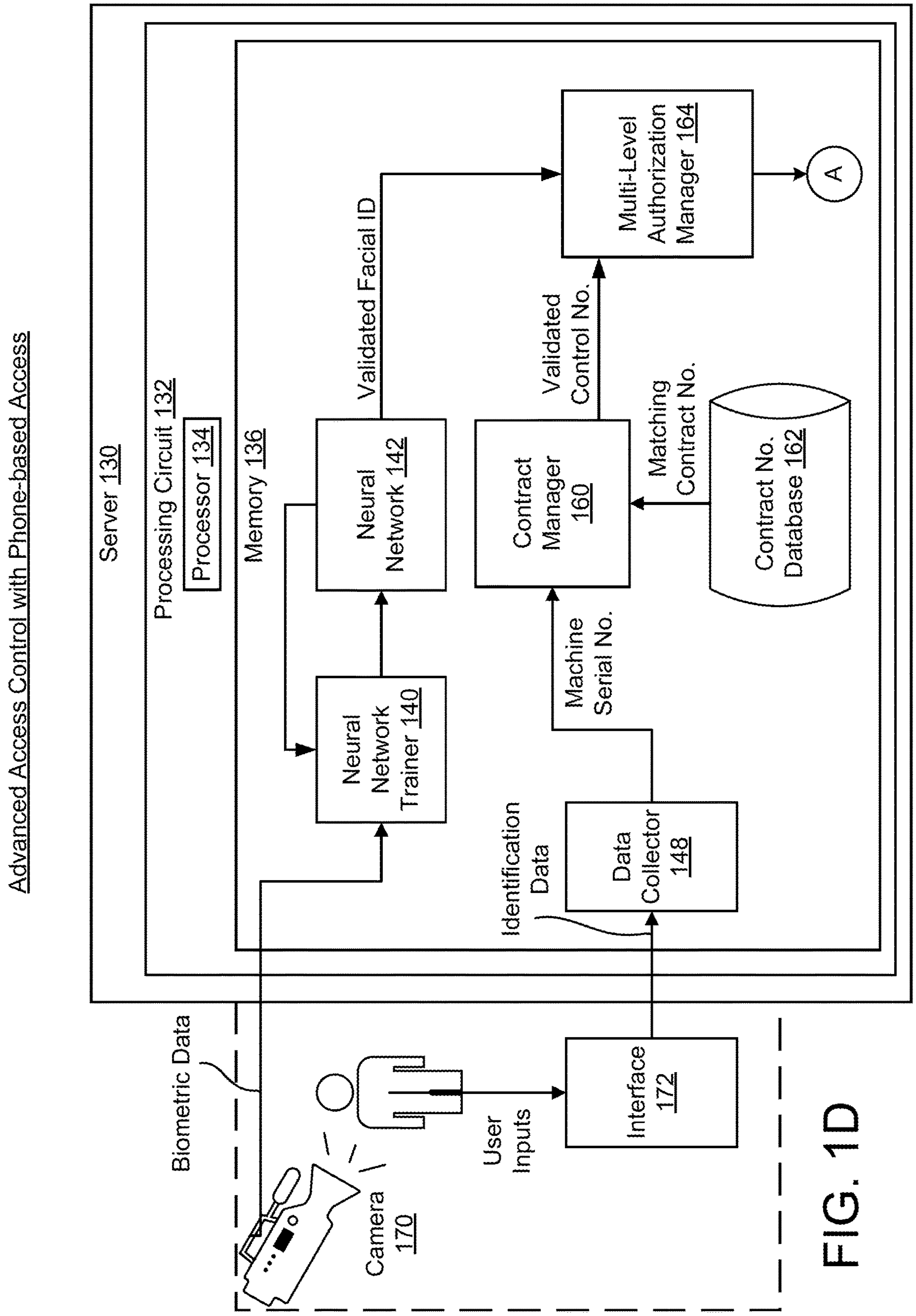
FIG. 1D is a block diagram of a server which can be implemented in the system of FIG. 1A, according to an exemplary embodiment.

Referring now to FIG. 1D, another embodiment of server 130 is shown, according to some embodiments. In some embodiments, the information provided by the operator to register and/or to verify prior to operating the equipment is provided via hardware proximate the equipment (e.g., within the cab of the equipment, etc.). For example, camera 170 records biometric data (e.g., facial data, etc.) and provides it to neural network trainer 140 either during the registration process or during the verification process or both. Additionally, the operator may provide training ID data during registration, equipment information (e.g., serial number, etc.), contract information, and other data to server 130 via interface 172. Interface 172 may be an interface on a tablet mounted in the cab of the equipment, with server 130 and the various operations performed thereof being located on one or more processing circuits within the tablet.

Figure 2:
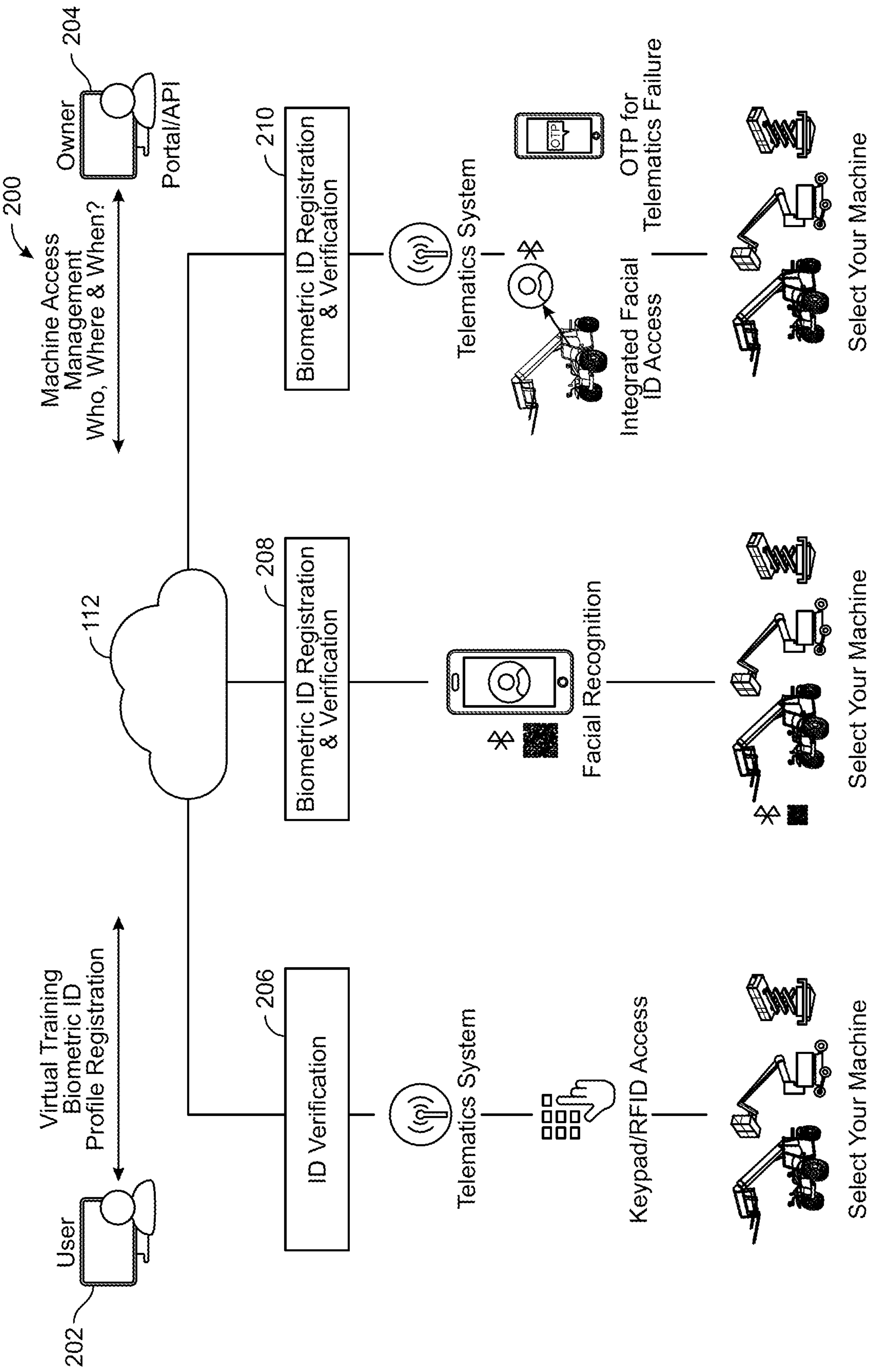
FIG. 2 is a diagram of an access control system which may be incorporated into the system of FIG. 1A, according to an exemplary embodiment.

Referring now to FIG. 2, system 200 for performing facial recognition to provide access to operators for operation of a commercial vehicle is shown, according to an exemplary embodiment. In an exemplary embodiment, system 200 is substantially similar to system 100. System 200 may be incorporated partially or entirely within system 100. Conversely, system 100 may be incorporated partially or entirely within system 200. System 200 is shown to include user registration hub 202, MAM hub 204, and cloud 112.

User registration hub 202 may be a computer or other device connected to cloud 112 and configured to provide registration information from one or more operators (e.g., users, user 102, etc.) to system 200. User registration hub 202 may include the functionality of workstation 106 and may be configured to display application 110, as shown in FIG. 1. MAM hub 204 may be configured to manage the operational processes regarding system 200. MAM hub 204 may be identical or substantially similar to MAM module 118. MAM module 204 is shown to provide "Who, Where, & When" information to cloud 112. This information may include who is operating various vehicles, where the vehicles and/or the operators are located, what time the operators received access to the vehicles, and what time the operators left the vehicles. System 200 is further shown to keypad access process 206, facial recognition process 208, and integrated facial recognition process 210.

Keypad access process 206 may be configured to provide keypad access to one or more operators during registration and/or verification. Facial recognition process 208 may be configured to register/verify operators using at least in part facial recognition. Integrated facial recognition process 210 may be configured to integrate multiple systems (e.g., telematics, equipment interfaces, mobile devices, etc.) to perform facial recognition for registration/verification for equipment.

Application Connection Features

Figure 3:
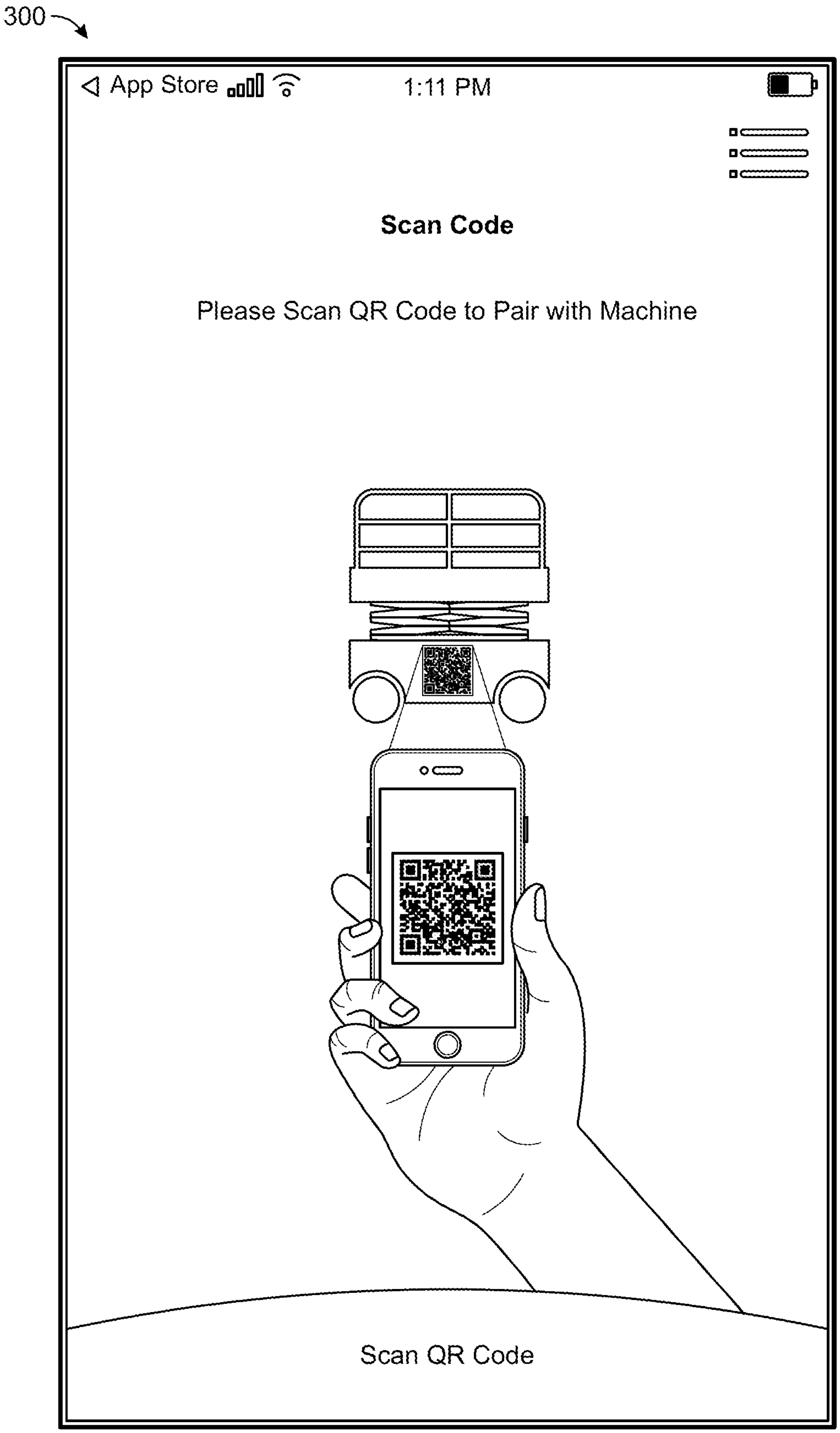
FIG. 3 is an interface of an application for an access control system which can be used in the system of FIG. 1A, according to an exemplary embodiment.

Referring now to FIG. 3, an interface 300 for displaying an application for connecting with a commercial vehicle is shown, according to an exemplary embodiment. Interface 300 is shown displaying application 110 as shown in FIG. 1. Interface 300 shows user 102 connecting to a commercial vehicle by scanning a QR code with user device 108. Via this connection, user 102 may be able to request access to this vehicle via application 110.

In an exemplary embodiment, user 102 opens application 110 on user device 108, captures their image via a picture capture and provides (e.g., keys-in, types in, etc.) a contract ID number and a training ID number. The captured image along with the contractor and training ID information is sent to cloud 112 for further processing. Via cloud 112, data management system 114 creates a database (e.g., user profile database 120, etc.), dynamically, to add the operator under each contractor's identification number. Before it is added, it verifies if user 102 possesses a valid training ID, of which information is stored within the training database (e.g., user profile database 120, etc.) within the cloud. On successful verification, operator's name will be added to the database. Data management system 114 may then extract biometric information of the operator from the image using artificial intelligence and machine learning techniques within cloud 112. This biometric ID is paired with the operator's name and a signal is sent back to user device 108 informing the state of registration (e.g., access granted, access denied, limited access granted, etc.). This process may refer to a phone-based access registration process.

Figure 7:
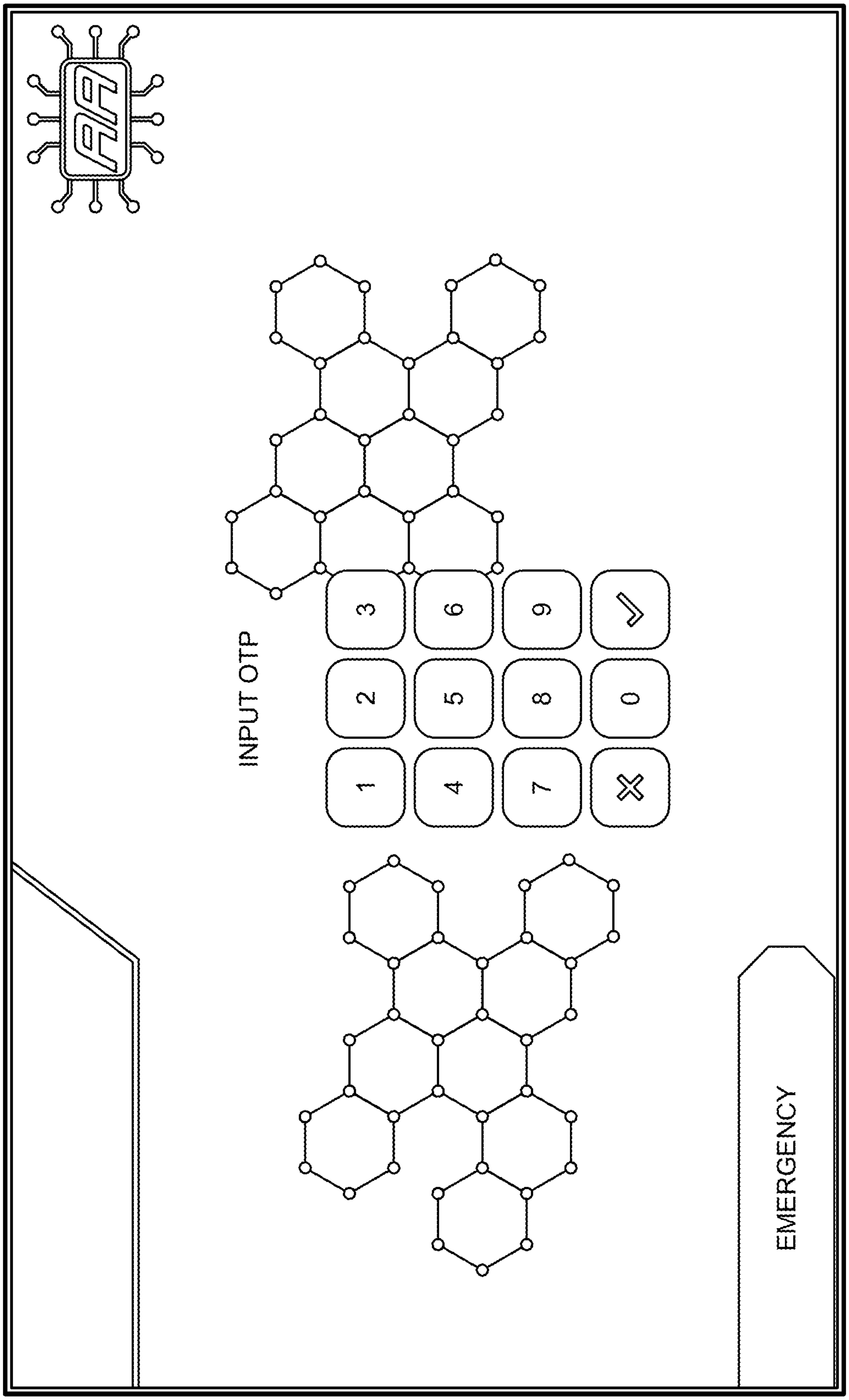
FIG. 7 is a diagram of a framework for determining access to a commercial vehicle, which can be implemented by the server of FIG. 1C, according to an exemplary embodiment.

In an exemplary embodiment, user 102 may register for access control via facial recognition in similar fashion as described above. After successful registration, user 102 may want to gain access to equipment for performing work at the construction site. During this process, user 102 goes to the machine of interest and opens (e.g., displays, etc.) application 110 on user device 108. User device 108 and the equipment (e.g., scissor lift) are paired through a local area network (LAN) or personal area network (PAN) (e.g., PAN via Bluetooth®, ZigBee®, etc.). This is shown in FIG. 3, where user 102 connects to the commercial vehicle via wireless connection. After connecting (e.g., pairing, etc.), application 110 obtains the machine serial number, stores the information, and waits for the operator to capture a faceprint for processing. Once a faceprint is captured, application 110 provides the faceprint and the machine serial number to a cloud database (e.g., user profile database 120, etc.). Out of several profiles, data management system 114 selects the correct profile by searching for, for example, the contract number a machine serial number is associated with. After locating the appropriate database, the faceprint is converted into a biometric data and applies a machine learning technique to identify the user (e.g., operator, user 102, etc.). MAM module 118 may then progress through a series of multi-level hierarchical authorization checks (e.g., as shown in FIG. 7, etc.) before an approval signal indicating access to the vehicle is sent back to user device 108. This embodiment may refer to a phone-based verification process.

In an exemplary embodiment, the process of providing information to cloud 112 within system 100 is possible only if the operator is seated in an equipment provided with a seat. In case of an aerial work platform, user 102 may need to depress the foot pedal from the work platform to gain access. This may be similar to the process required for a scissor lift. These processes may prevent illegal authorization and prevent unauthorized operators to operate.

Figure 4:
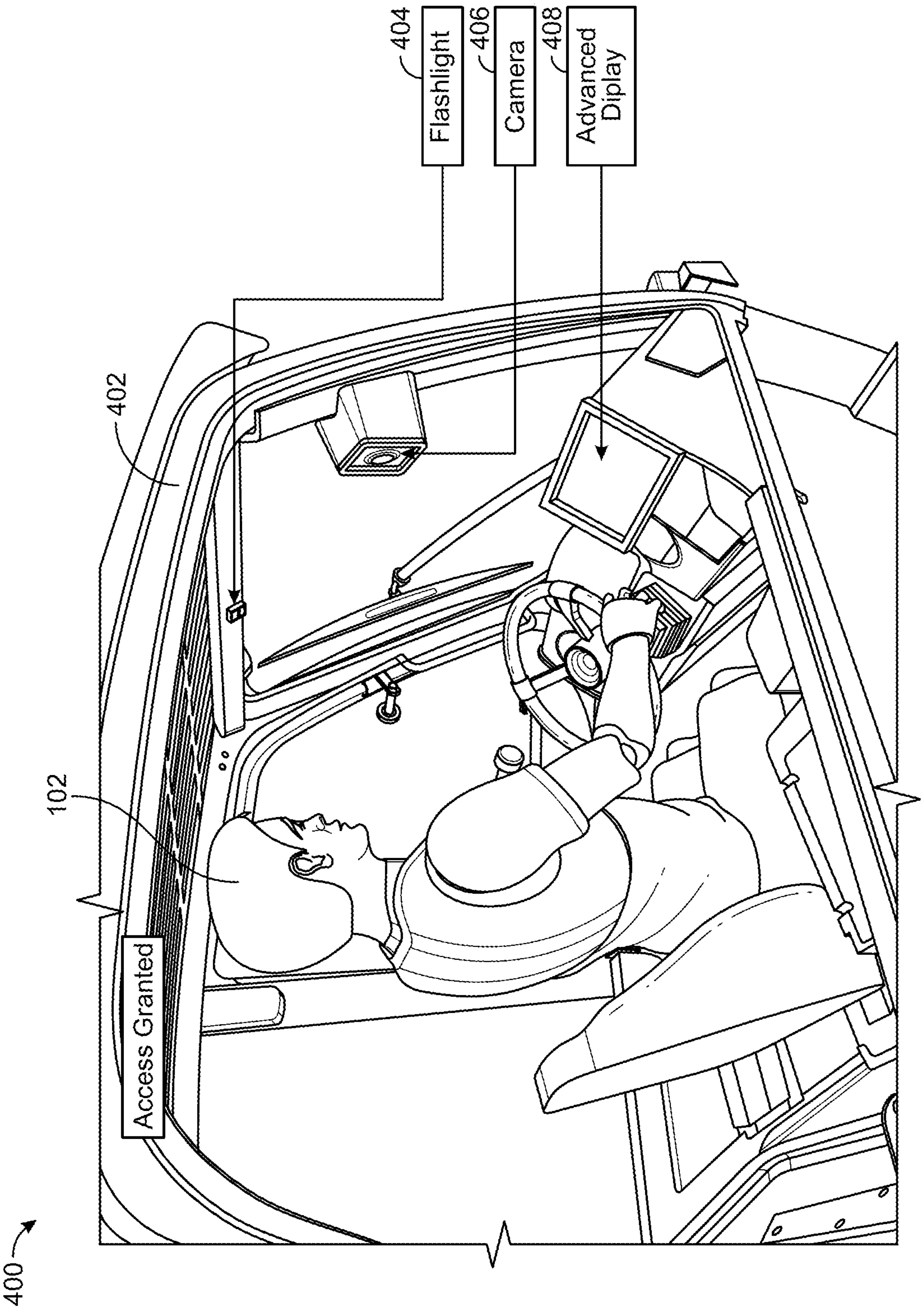
FIG. 4, is a drawing of a user receiving access to a commercial vehicle, which can be part of the system of FIG. 1A, according to an exemplary embodiment.
Figure 5:
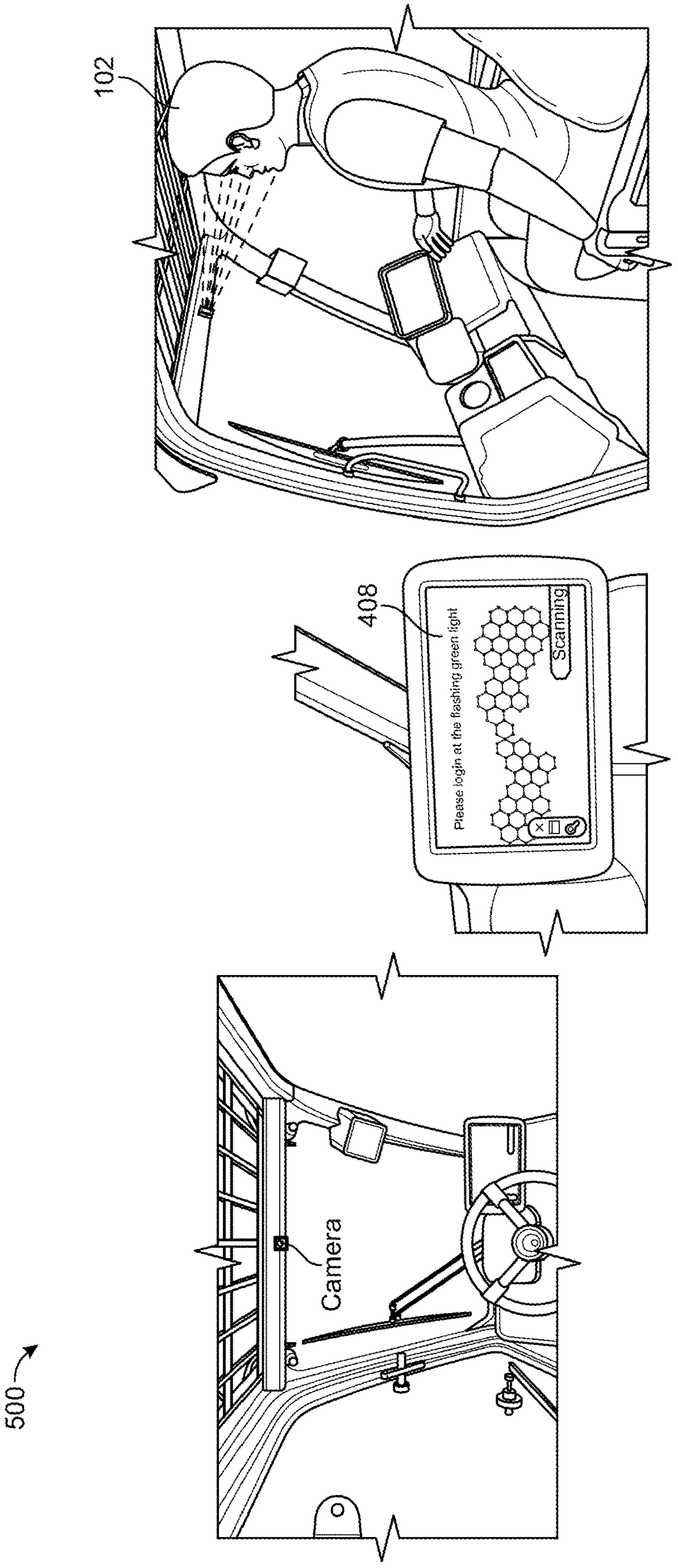
FIG. 5 is another embodiment of a user receiving access to a commercial vehicle, which can be part of the system of FIG. 1A, according to an exemplary embodiment.

Referring now to FIGS. 4-5, diagrams 400, 500 for displaying a user receiving access in a commercial vehicle is shown, according to an exemplary embodiment. Referring to FIG. 4, diagram 400 shows user 102 receiving access to operate commercial vehicle 402, as indicted by the illuminating dashboard in vehicle 402. Referring to FIG. 4, diagram 500 shows user 102 receiving access from different perspectives. The components within systems 400, 500 may be referred to with reference to either diagram and diagrams 400, 500 may be referred to interchangeably. Flashlight 404 is shown to illuminate the interior of the cab of vehicle 502 to notify user 102 that he/she has received access to operate the vehicle. Camera 406 may be part of facial recognition module device 104 and may be configured to capture the image of user 102 for facial recognition. Advanced display 408 may be configured to display information to user 102.

In an exemplary embodiment, the registration process and/or the verification process is performed using machine hardware. Vehicle 402 may be equipped with operator seating features. In some embodiments, the hardware within the cab of vehicle 402 includes one or more cameras, one or more flashlights, an edge computer, and/or an advanced display.

In an exemplary embodiment, camera 406 is located on the C-Pillar of vehicle 402, but can be located right on the header (e.g., directly opposite to the line of sight of the operator), as shown in FIG. 5. Flashlight 404 can be a continuous light embedded in the cab of vehicle 402, as shown in FIG. 4. In other embodiments, flashlight 404 is a periodic series of light strip or a small light strip at any location within the cab of vehicle 402 to satisfy the lighting requirements for a high-quality image.

In an exemplary embodiment, user 102 (e.g., the operator) is seated in the seat within vehicle 402 provided with a seat. Advanced display 408 may change its screen throughout the verification process. The operator may press 'Register' for registering their facial biometric information. The next screen may collect information about the contractor name, training identification number, and contract identification number. Flashlight 404 may then illuminate the cab of vehicle 402, and camera 406 will capture the image of the seated operator after gaining their attention through a small lit green light right below the camera. Images captured via the camera may be sent to cloud 112 using an on-board embedded system and/or machine telematics along with the operator entered data and the system identified machine serial number.

Figure 6:
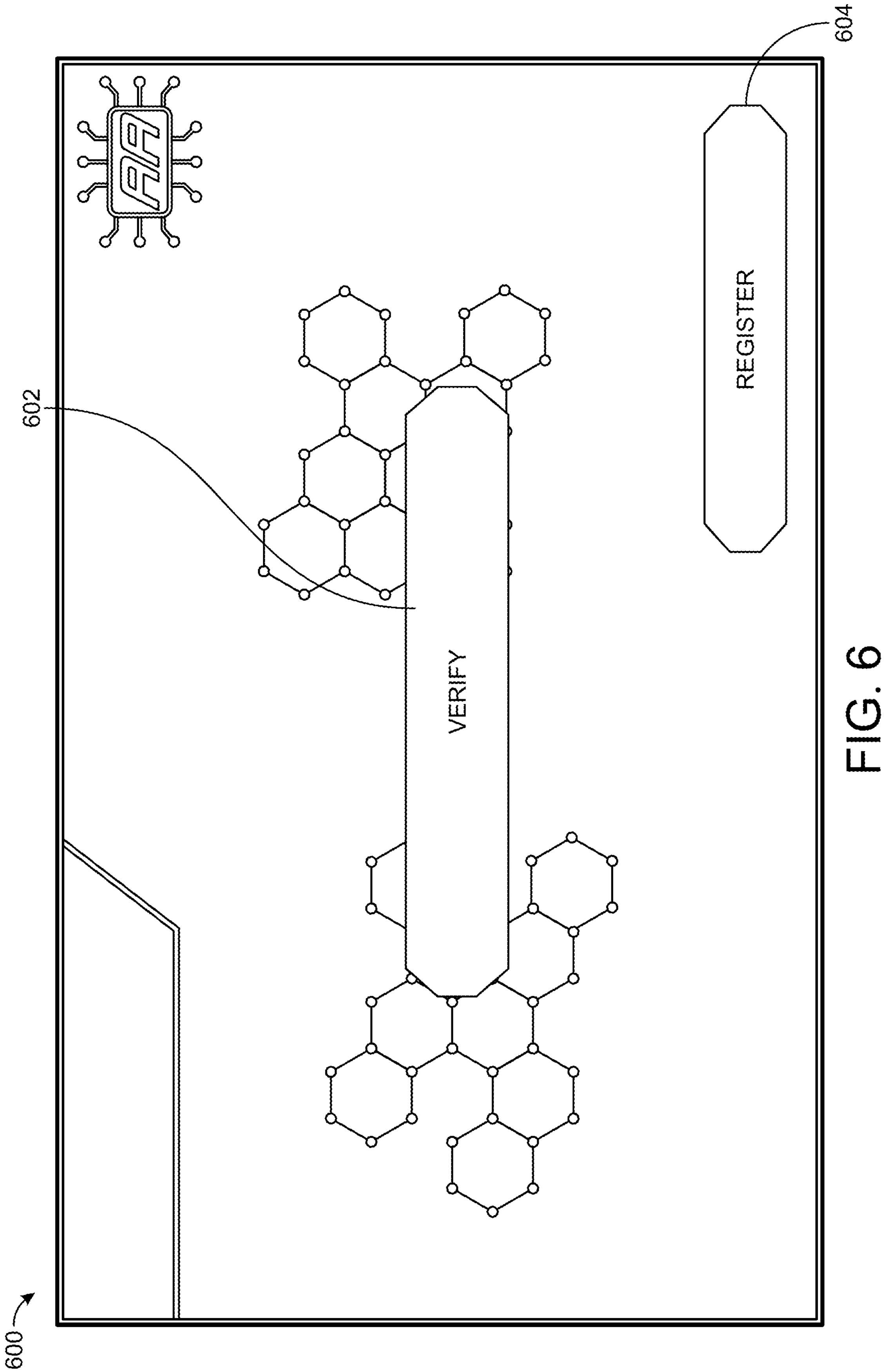
FIG. 6 is a drawing of an interface for verifying an operator for a commercial vehicle, which can be used in the application of FIG. 1A, according to an exemplary embodiment.

Referring now to FIG. 6, an interface 600 for verifying, registering for access to a commercial vehicle is shown, according to an exemplary embodiment. Interface 600 may be displayed on user device 108 as shown in FIG. 1. In an exemplary embodiment, user 102 interacts with interface 600 to verify and/or register for access control via facial recognition. Interface 600 is shown to include verify widget 602 and register widget 604.

Verify widget 602 may be selected by user 102 to verify access control to a commercial vehicle. For example, user 102 has registered a profile within system 100 and is attempting to access a commercial vehicle. Upon entering the cab of the commercial vehicle, a display device (e.g., user device 108) is located within the cab that displays interface 600 via application 110. User 102 selects the verify widget 602 to gain access to the commercial vehicle. Data management system 114 receives the request via cloud 112 and instructs facial recognition module device 104 to take a faceprint of user 102. Data management system 114 then determines whether user 102 is allowed access to operate the commercial vehicle. Upon a determination that user 102 is allowed access, interface 600 displays "allowed," and user 102 is notified that he/she has access to operate the commercial vehicle.

Register widget 604 may be configured to register user 102 with a profile for system 100. For example, a user 102 selects register widget 604 to register a profile within system 100. Facial recognition module device 104 takes an image of user 102 to determine a faceprint and provides the faceprint to data management system 114 to store in a profile of user 102.

In an exemplary embodiment, the verification process begins automatically when an operator is seated in the seat. The advanced display in the screen will show verification widget 602 and register widget 604. The operator will press the 'verify' button to initiate the verification sequence. The flashlight comes on and the camera captures the image of the seated operator. The captured image is sent to the cloud (e.g., cloud 112) through an on-board embedded system that communicates to the cloud through machine telematics. While the image (e.g., faceprint, etc.) information is sent to the cloud, the on-board embedded system collects the machine serial number also to facilitate the cloud software to locate the appropriate contractor database. Upon receiving an approval from the cloud, the operator is provided with an access.

Referring now to FIG. 7, an interface 700 for displaying a secondary verification method for access control in a commercial vehicle is shown, according to an exemplary embodiment. In an exemplary embodiment, equipment telematics is unable to establish a connection with data management system 114 (e.g., via the Internet, etc.) or there is a failure in a telematics device, the system will switch to a screen as show in FIG. 7. As such, facial recognition module device 104 switches to a pin-based access. The pin may be a One-Time Password (OTP) that is received via user device 108 by making a request to cloud 112. In some embodiments, the operator walks to a location where internet is available, such that a request to the cloud for an OTP can be made. They may then walk to the equipment and enter the OTP. The on-board embedded computer (e.g., a processing circuit) will infer the OTP to determine access authorization. Incorrect OTP entry attempt for more than three times will lock-out the system and the operator will have to contact the contractor for access. The processing and/or functionality disclosed in this embodiment may be performed by facial recognition module device 104, application 110, data management system 114, or any combination thereof.

Figure 8:
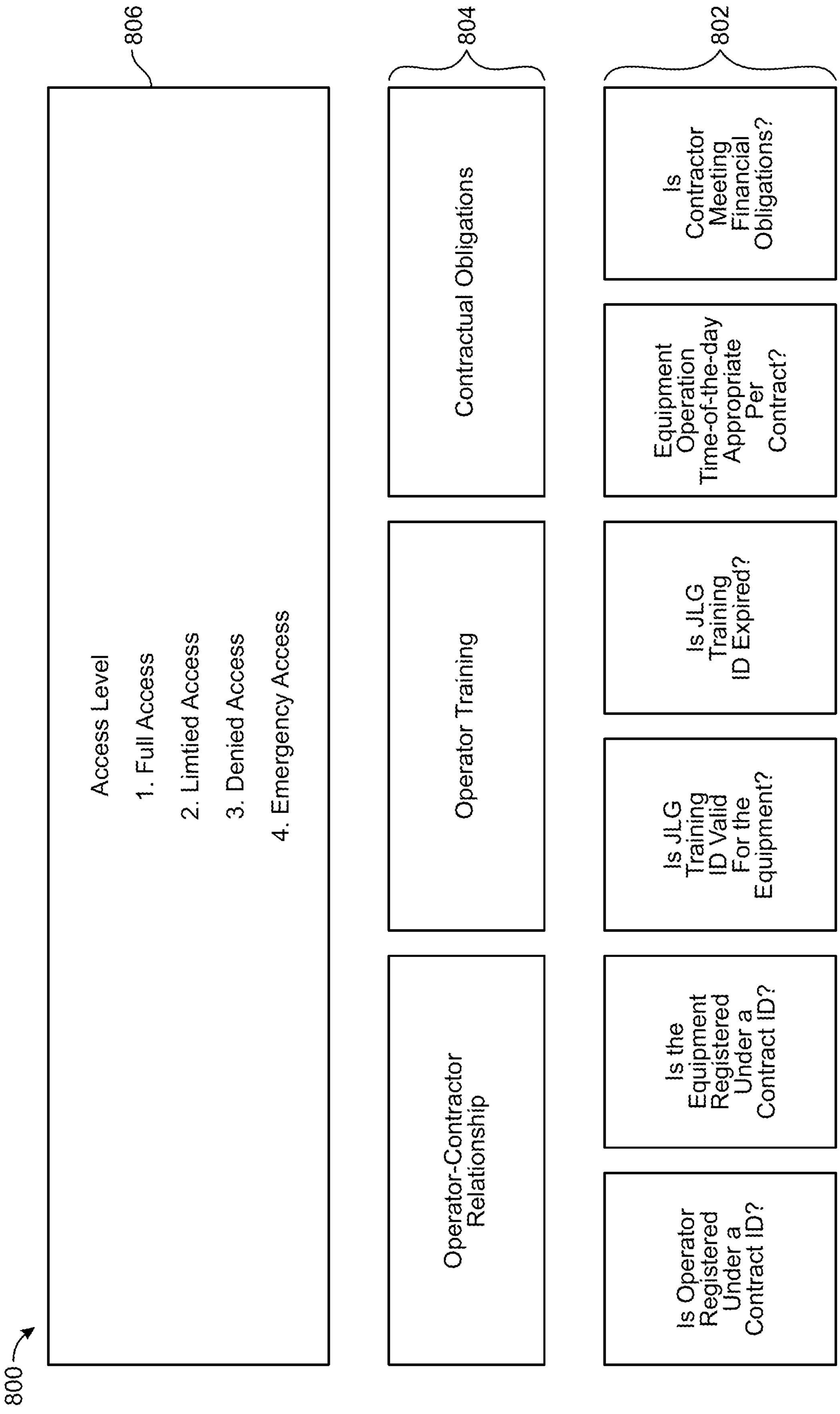
FIG. 8 is a drawing of a user receiving limited access to a commercial vehicle, which can be part of the system of FIG. 1A, according to an exemplary embodiment.

Referring now to FIG. 8, a diagram 800 for representing a hierarchical multi-level framework for access control is shown, according to an exemplary embodiment. Diagram 800 is shown to include first level 806, second level 804, and third level 802. The methods, processing and/or functionality for implementing diagram 800 may be performed by server 130, facial recognition module device 104, application 110, data management system 114, or any combination thereof. Particularly, the methods, processing and/or functionality for implementing diagram 800 may be performed by multi-level authorization manager 164.

Figure 9:
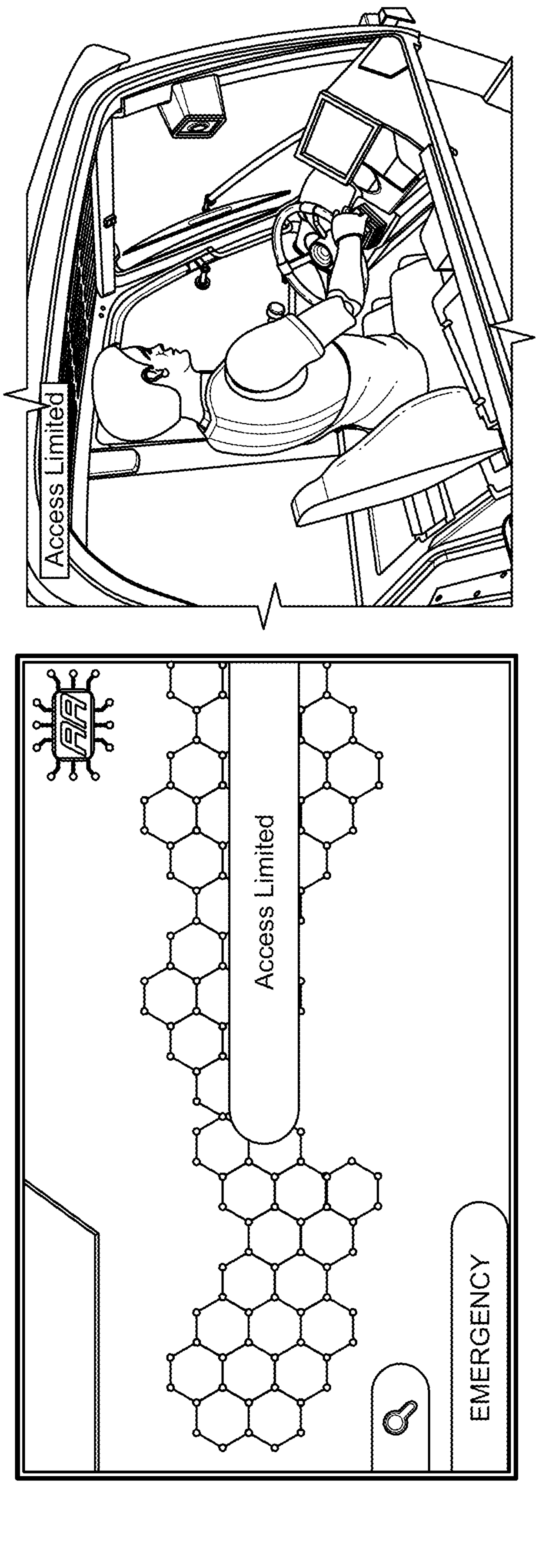
FIG. 9 is an interface for providing operator information, which can be used in the application of FIG. 1A, according to an exemplary embodiment.

Referring now to FIG. 9, an interface 900 for displaying limited access for an operator for a commercial vehicle is shown, according to an exemplary embodiment. Both FIGS. 8-9 may be referred to for the embodiments disclosed below.

In an exemplary embodiment diagram 800, first level 806 shows "Access Level" is classified into four levels: (i) Full Access; (ii) Limited Access; (iii) Denied Access; and (iv) Emergency Access. In order to determine what level of access to be provided for an operator, the processing circuitry (e.g., multi-level authorization manager 164, MAM module 118, etc.) through a hierarchical tree structure to determine the status. The first level of hierarchy may include three elements: (i) Establishing contractor-operator relationship; (ii) Establishing operator training status; and (iii) Establishing elements of floating or fixed type of contract. In some embodiments, Server 130, which may be configured to implement advanced access control (AAC), may evaluate if an operator is registered under a contract ID and if the equipment from where the access request is made is registered under a contract ID (as described above with reference to FIGS. 1A-D). If either of these criteria is not met, then the access can be denied. Server 130 may not initiate a search on other branches of the hierarchy. Conversely, if the criteria are met under the first branch of the hierarchy, then the system may initiate a search on the second branch (i.e., second level 804) to evaluate information about the operator training and their status. Server 130 may communicate with system training database 146 to determine if an operator is trained and if so, on what type of equipment (e.g., vehicle 402, etc.). If the information is affirmative and indicates that the user is registered for the vehicle, then server 130 may evaluate the next element in the branch, which is to evaluate if the license obtained from training software (e.g., via an operator on workstation 106). If either of these criteria are not met, then the access level chosen will be 3, which is "denied access." Conversely, if the second branch is successfully met, then MAM module 118 will initiate search on the last branch where it will determine if the contractor is meeting the contractual obligations. These obligations include determining if the contractor has paid their rental fees. If this is affirmative, the search continues to determine the type of contract-fixed or floating (shared rental). If it is a floating rental, the software evaluates the day and time of request and determines if the equipment can be used by the requested operator's contractor during that specific day and time. On positive responses from these branches of hierarchy, MAM module 118 will provide full access to the operator.

In an exemplary embodiment, Level 2 (i.e., Limited Access) limits the functionalities of the commercial vehicle. For example, the operator can operate only for a limited duration (e.g., 5 minutes, 10 minutes, etc.). In other embodiments, Level 2 of first level 806 includes limiting the type of equipment used by the operator. A level 2 access may be provided under specific conditions, such as: (i) Training license of the operator expired in the past few days or about to expire in next 24 hours; (ii) the contractor didn't pay their rental fees; (iii) the equipment is operated beyond the time of the day or day of the week as agreed in the contract. These are examples of conditions, but not a comprehensive list as other conditions will be added in future as needed. User device 108 may display the "Access Limited" screen as shown in FIG. 9 below and will remain, enabling a visual indication to people outside the equipment at the construction site. During verification process, server 130 may take into account multiple criteria determined via multi-level authorization manager 164 to selectively provide access to the operator.

Level 3 of first level 806 may be configured to deny access to the operator. Advanced display 408 (e.g., which may be displayed on user device 108, etc.) may not show "Access Denied" on the screen, and instead may switch to a one time passcode (OTP) screen to provide an opportunity for the operator to request OTP. This may encourage unauthorized users (e.g., hackers, thieves, etc.) to enter a password for few times before the system locks up and sends out an emergency signal to the operator via text message. Additionally, the flashlight may turn into 'red color' providing a visible clue to the people outside the machine.

Level 4 of first level 806 may be configured to provide emergency access. This level may provide very limited functionalities for a short duration (e.g., 5 minutes, 10 minutes, etc.). However, the screen may display image as shown in FIG. 9. This is used only if someone want to move the machine in an emergency situation. This functionality will disable machine's ability to climb up the hill or a ramp, thereby ensuring unauthorized users (e.g., hackers, thieves, etc.) cannot steal the machine by moving the machine up on a truck's ramp by utilizing this feature. In an exemplary embodiment, unauthorized users (e.g., hackers, thieves, etc.) attempt to remove the on-board system or camera 406, the facial recognition module device 104 is enabled with an alarm system that will alert the people around the machine, and at the same time. Additionally, it may send a distress signal to the contractor via a text message (e.g., via user device 108).

In some embodiments, diagram 800 may be intended to show that the various branches of the tree (e.g., first level 806, second level 804, third level 802) are divided systematically to ensure a broad range of criteria for providing appropriate access. For example, "Is the Operator Registered Under a Contract ID" may be part of the Operator-Contractor Relationship Subcategory. In the event that the Operator is not registered under a contract ID, this data can be used to affect the access provided to the operator during the registration and/or verification processes outlined above.

In some embodiments, the various criteria provided in third level 802 are determined by multi-level authorization manager 164 and are fed into a matrix to determine appropriate access to grant to the operator. For example, if all criteria in third level 802 are met, then the operator is granted full access. If one or more criteria are not met, the operator is given limited access. If all criteria are not met, the operator is denied access. Other embodiments may be considered.

Figure 10:
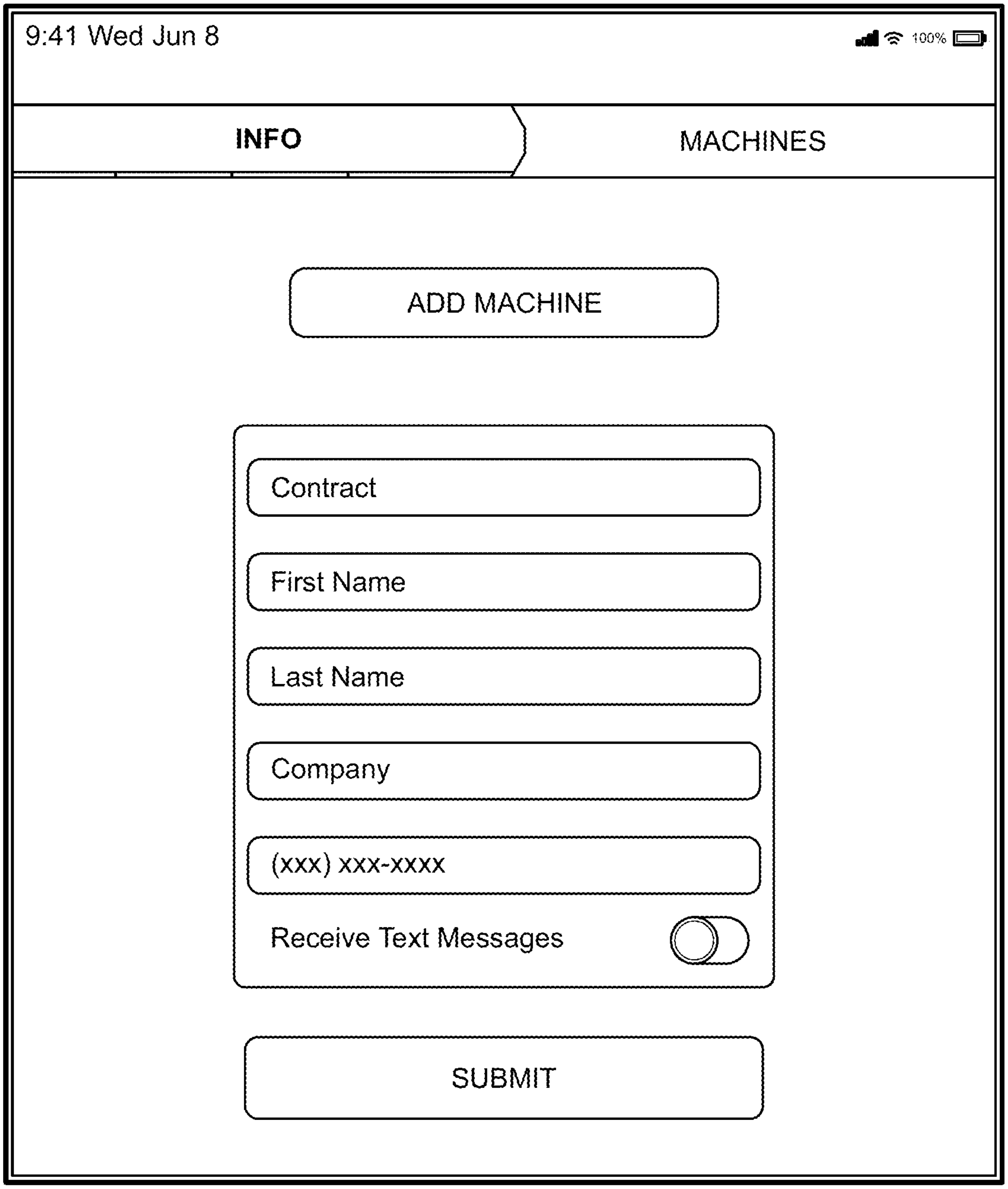
FIG. 10 is an interface for displaying information relating to a commercial vehicle, which can be used in the application of FIG. 1A, according to an exemplary embodiment.
Figure 11:
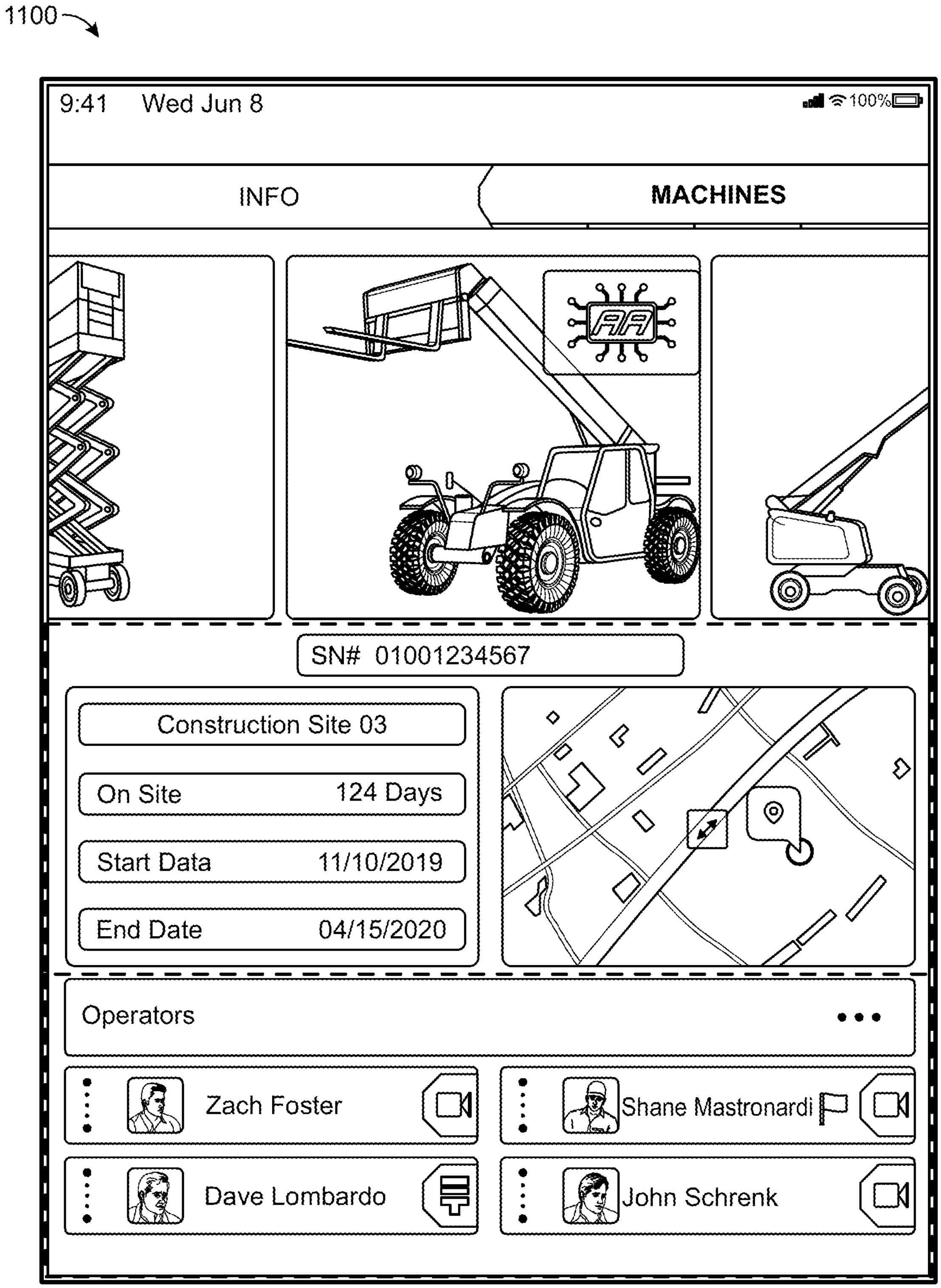
FIG. 11 is an interface for displaying access rights for operators of a commercial vehicle, which can be used in the application of FIG. 1A, according to an exemplary embodiment.
Figure 12:
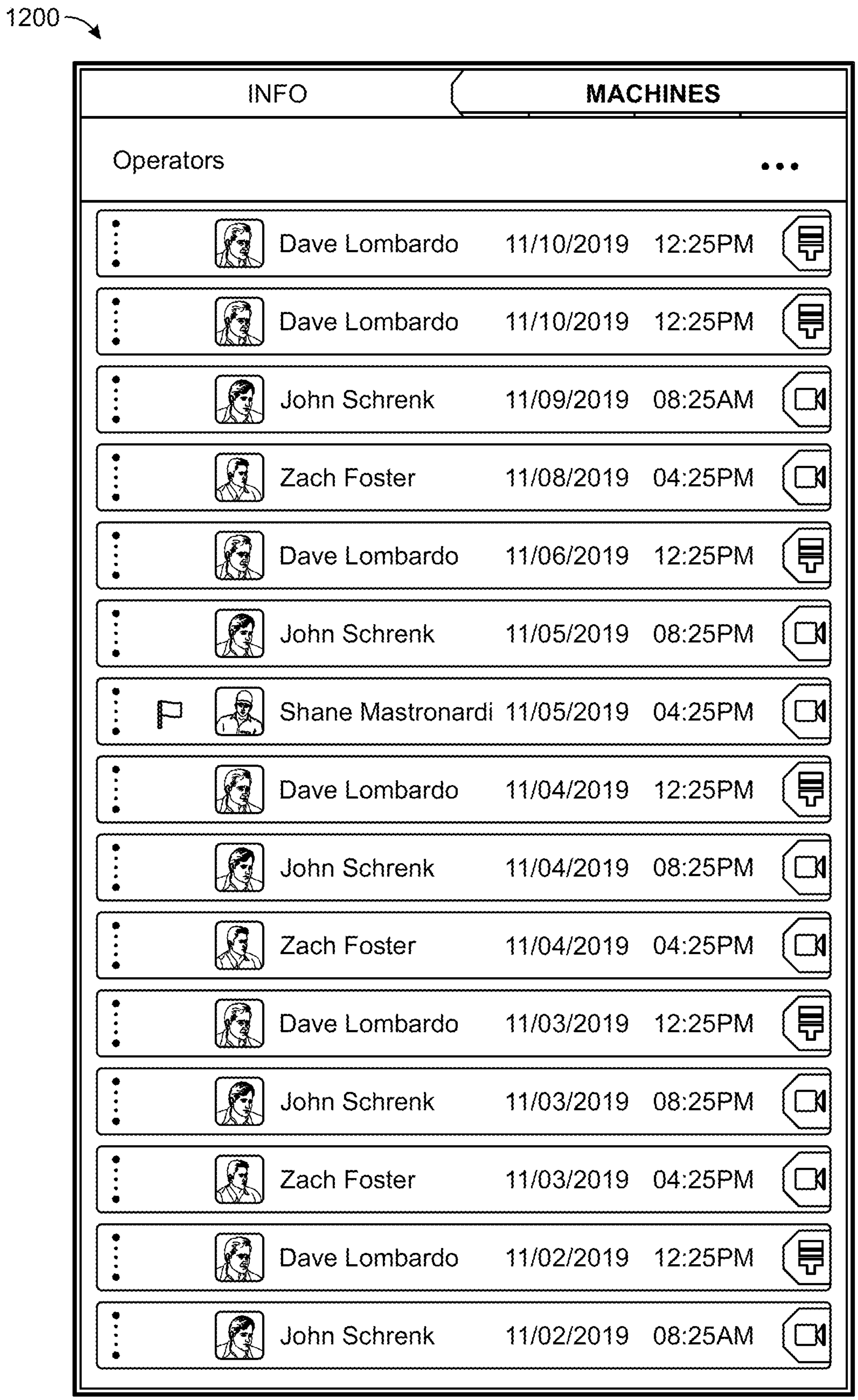
FIG. 12 is a flow diagram of a process for receiving access to a commercial vehicle, which can be performed by the system of FIG. 1A, according to an exemplary embodiment.

Referring now to FIGS. 10-12 various interfaces of application 110 are shown, according to exemplary embodiments. The interfaces disclosed with reference to FIGS. 10-12 may be displayed on user device 108. Referring now to FIG. 10, interface 1000 for entering user information is shown, according to an exemplary embodiment. Interface 1000 is shown to receive contract, name, company, and phone information from a user (e.g., user 102, etc.).

In an exemplary embodiment, application 110 includes two tabs: (i) Info; and (ii) Machines. Under the 'info' tab, user 102 may enter their name, company, and phone number information. They can include equipment rented under their contract by pressing 'ADD MACHINE' button, which will take them to 'MACHINES' tab. In this tab, they can enter machine serial number and contract information.

Referring now to FIG. 11 an interface 1100 for providing information to a user in application 110 is shown, according to an exemplary embodiment. User 102 may connect to data management system 114 after generating a profile, receiving access to a vehicle, or both. User 102 may then be able to receive system information via cloud 112 to application 110, such that user 102 can view various information related to the construction site and/or system 100. This information may include the vehicle for which user 102 has been granted access to, the location of the construction site, operator information, time at which user 102 was granted access, date of construction job or operation, and the authorization level for which user 102 has been granted.

Referring now to FIG. 12, an interface 1200 for providing user 102 with information related to other users is shown, according to an exemplary embodiment. Interface 1200 may show various users and their authorization levels (e.g., access level) with regards to particular vehicles. Interface 1200 may also show notification preferences of various users, such as text notifications, email notifications, or call notifications. Interface 1200 may be displayed via application 110.

In an exemplary embodiment, interface 1200 may display additional information under the "Info" tab. The contractor may have an option to choose whether to receive the text messages for every login in the machine about who is operating which machine. Interface 1200 may also include functionality to turn it off in application 110.

Figure 13:
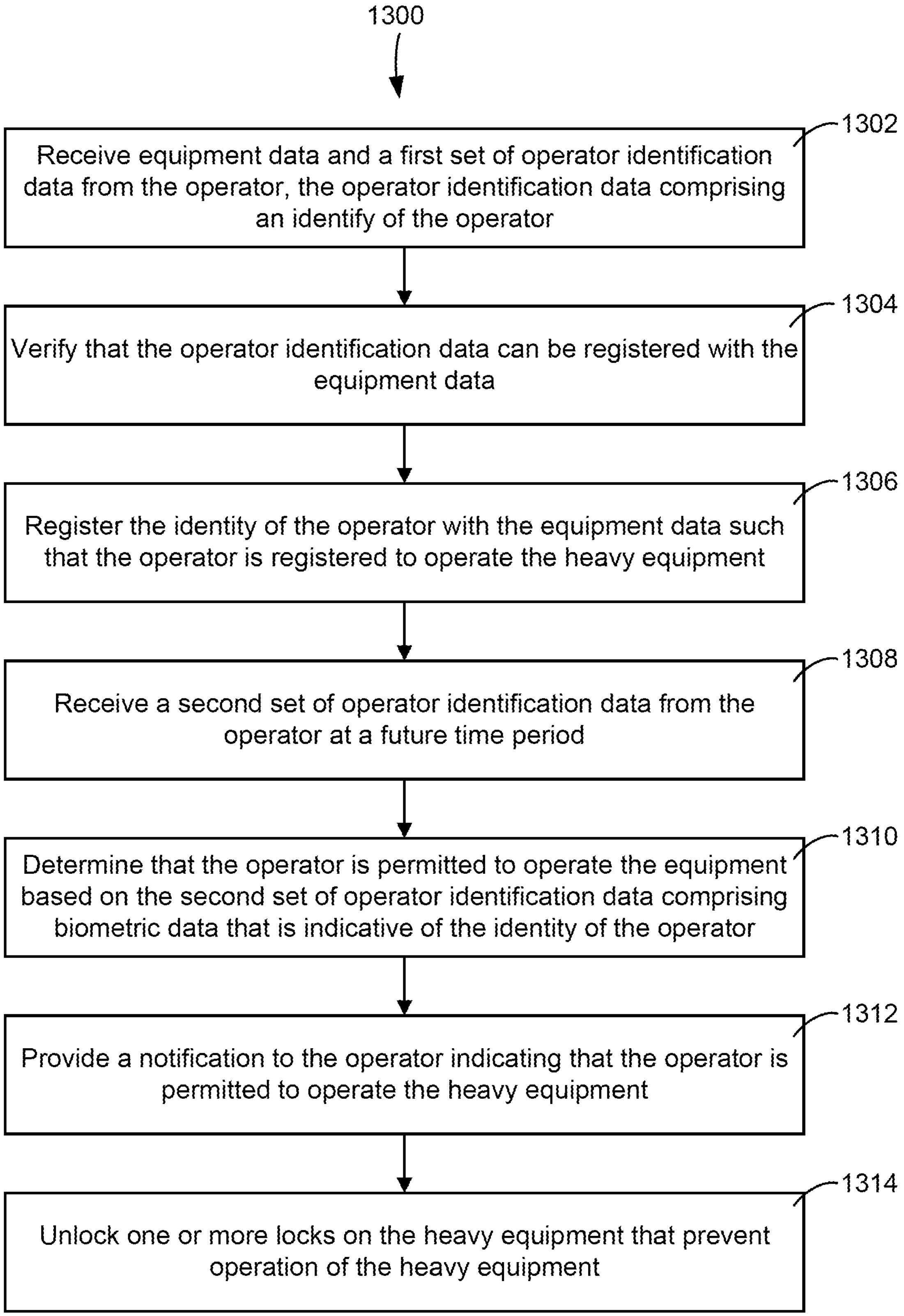
FIG. 13 is a flow diagram of process for performing registration and verification of an operator, which can be performed by the server of FIG. 1A, according to an exemplary embodiment.

Referring now to FIG. 13, a flow diagram of process 1300 of performing registration and verification of an operator is shown, according to some embodiments. Process 1300 may be performed by any of the processing circuitry described herein, such as server 130. Process 1300 is shown to include receiving equipment data and a first set of operator identification data from the operator, the operator identification data comprising an identify of the operator (step 1302). Process 1300 is shown to include verifying that the operator identification data can be registered with the equipment data (step 1304). Process 1300 is shown to include registering the identity of the operator with the equipment data such that the operator is registered to operate the heavy equipment (step 1306). Process 1300 is shown to include receiving a second set of operator identification data from the operator at a future time period (step 1308). Process 1300 is shown to include determining that the operator is permitted to operate the equipment based on the second set of operator identification data comprising biometric data that is indicative of the identity of the operator (step 1310). Process 1300 is shown to include providing a notification to the operator indicating that the operator is permitted to operate the heavy equipment (step 1312). Process 1300 is shown to include unlocking one or more locks on the heavy equipment that prevent operation of the heavy equipment (step 1314).

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the applications (e.g., application 114) as shown in the various exemplary embodiments is illustrative only. Additionally, any element disclosed in one embodiment may be incorporated or utilized with any other embodiment disclosed herein. For example, the module 210 of the exemplary embodiment shown in FIG. 2 may be incorporated in module 212 of the exemplary embodiment shown in FIG. 2. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for providing access to an operator for a heavy equipment, the method comprising:

receiving heavy equipment data and a first set of operator identification data from the operator, the operator identification data comprising an identity of the operator and a level of heavy equipment training completed by the operator, the level of heavy equipment training completed by the operator indicating which of a plurality of different heavy equipment the operator is trained to operate;

verifying that the operator identification data can be registered with the heavy equipment data;

registering the identity of the operator with the heavy equipment data such that the operator is registered to operate the heavy equipment;

receiving a second set of operator identification data from the operator at a future time;

providing the operator full access to the heavy equipment in response to determining that: (i) the second set of operator identification data matches stored biometric data of a registered operator, (ii) the operator is registered under a contract identification number associated with the heavy equipment, (iii) the operator is trained to operate a type of the heavy equipment and has a training license that is valid at the future time, (iv) a contractor associated with the operator is meeting contractual obligations associated with the heavy equipment, and (v) when the heavy equipment is subject to a floating contract, the contractor associated with the operator is assigned to use the heavy equipment at the future time;

providing the operator with limited access to the heavy equipment in response to determining that: (i) the second set of operator identification data matches stored biometric data of the operator, (ii) the operator is registered under the contract identification number associated with the heavy equipment, (iii) the heavy equipment is registered under the contract identification number, (iv) the operator is trained to operate the type of the heavy equipment, and (v) the training license of the operator being expired within a threshold time period before or after the future time; and providing the operator with no access in response to determining that the operator is not registered under the contract identification number associated with the heavy equipment;

wherein the operator is provided with limited access by operating the heavy equipment in a limited access mode in which one or more functionalities of the heavy equipment are disabled and the heavy equipment is operable by the operator for a first period of time; and wherein the operator is provided with emergency access by operating the heavy equipment in an emergency access mode in which the heavy equipment is drivable yet prevented from being driven up a hill or a ramp and is operable by the operator for a second period of time that is shorter than the first period of time.

2. The method of claim 1, wherein the method further comprises:

providing a notification to the operator indicating that the operator is provided full access to operate the heavy equipment; and unlocking one or more locks on the heavy equipment that prevent operation of the heavy equipment.

3. The method of claim 1, wherein receiving the heavy equipment data and the first set of operator identification data from the operator comprises:

receiving a contract number associated with the operation of the heavy equipment;

receiving an operator number associated with employment of the operator; and receiving a first set of facial image data of the operator; and wherein the biometric data is a second set of facial image data of the operator.

4. The method of claim 1, wherein receiving the heavy equipment data and the first set of operator identification data from the operator comprises;

receiving the heavy equipment data and the first set of operator identification data via a mobile device of the operator.

5. The method of claim 1, wherein receiving the heavy equipment data and the first set of operator identification data from the operator comprises:

receiving the heavy equipment data via user inputs from the operator on an interface; and receiving at least part of the identification data via one or more cameras positioned on the heavy equipment.

6. The method of claim 1, wherein verifying that the operator identification data can be registered with the equipment data comprises:

querying a database to determine if the operator identification data is valid; and in response to determining that the operator identification data is valid, associating the operator identification data with a contractor number.

7. The method of claim 1, wherein the method further comprises:

determining a level of access for the operator using a multi-tiered access structure, the multi-tiered structure comprising the full access, the limited access, the emergency access, and the denied access; and wherein the multi-tiered access structure performs top-down hierarchy authentication to determine the level of access for the operator.

8. The method of claim 1, wherein determining that the operator is provided full access to operate the heavy equipment comprises:

determining the identity of the operator based on the biometric data; and in response to determining the identity of the operator, determining if the operator is registered to operate the heavy equipment.

9. A non-transitory computer-readable storage media having computer-executable instructions stored thereon that, when executed by one or more processors of a registration system, cause the registration system to perform operations comprising:

receiving heavy equipment data and a first set of operator identification data from the operator, the operator identification data comprising an identity of the operator and a level of heavy equipment training completed by the operator, the level of heavy equipment training completed by the operator indicating which of a plurality of different heavy equipment the operator is trained to operate;

verifying that the operator identification data can be registered with the heavy equipment data;

registering the identity of the operator with the heavy equipment data such that the operator is registered to operate the heavy equipment;

receiving a second set of operator identification data from the operator at a future time;

providing the operator full access to the heavy equipment in response to determining that: (i) the second set of operator identification data matches stored biometric data of a registered operator, (ii) the operator is registered under a contract identification number associated with the heavy equipment, (iii) the operator is trained to operate a type of the heavy equipment and has a training license that is valid at future time, (iv) a contractor associated with the operator is meeting contractual obligations associated with the heavy equipment, and (v) when the heavy equipment is subject to a floating contract, the contractor associated with the operator is assigned to use the heavy equipment at the future time;

providing the operator with limited access to the heavy equipment in response to determining that: (i) the second set of operator identification data matches stored biometric data of the operator, (ii) the operator is registered under the contract identification number associated with the heavy equipment, (iii) the heavy equipment is registered under the contract identification number, (iv) the operator is trained to operate the type of the heavy equipment, and (v) the training license of the operator being expired within a threshold time period before or after the future time; and providing the operator with no access in response to determining that the operator is not registered under the contract identification number associated with the heavy equipment;

wherein the operator is provided with limited access by operating the heavy equipment in a limited access mode in which one or more functionalities of the heavy equipment are disabled and the heavy equipment is operable by the operator for a first period of time; and wherein the operator is provided with emergency access by operating the heavy equipment in an emergency access mode in which the heavy equipment is drivable yet prevented from being driven up a hill or a ramp and is operable by the operator for a second period of time that is shorter than the first period of time.

10. The media of claim 9, wherein the media further comprises:

providing a notification to the operator indicating that the operator is permitted to operate the heavy equipment; and unlocking one or more locks on the heavy equipment that prevent operation of the heavy equipment.

11. The media of claim 9, wherein receiving the heavy equipment data and the first set of operator identification data from the operator comprises:

receiving a contract number associated with the operation of the heavy equipment;

receiving an operator number associated with employment of the operator; and receiving a first set of facial image data of the operator; and wherein the biometric data is a second set of facial image data of the operator.

12. The media of claim 9, wherein receiving the heavy equipment data and the first set of operator identification data from the operator comprises;

receiving the heavy equipment data and the first set of operator identification data via a mobile device of the operator.

13. The media of claim 9, wherein receiving the heavy equipment data and the first set of operator identification data from the operator comprises:

receiving the heavy equipment data via user inputs from the operator on an interface; and receiving at least part of the identification data via one or more cameras positioned on the heavy equipment.

14. The media of claim 9, wherein verifying that the operator identification data can be registered with the equipment data comprises:

querying a database to determine if the operator identification data is valid; and in response to determining that the operator identification data is valid, associating the operator identification data with a contractor number.

15. The media of claim 9, wherein the media further comprises:

determining a level of access for the operator using a multi-tiered access structure, the multi-tiered structure comprising the full access, the limited access, the emergency access, and the no access; and wherein the multi-tiered access structure performs top-down hierarchy authentication to determine the level of access for the operator.

16. The media of claim 9, wherein determining that the operator is permitted to operate the heavy equipment comprises:

determining the identity of the operator based on the biometric data; and in response to determining the identity of the operator, determining if the operator is registered to operate the heavy equipment.

17. An equipment registration system for providing access to an operator, the registration system comprising:

a heavy equipment configured to be operated by the operator;

a controller comprising a one or more processors and memory storing instructions that, when executed by the one or more processors, cause the one or more processors to perform operations comprising:

receiving heavy equipment data and a first set of operator identification data from the operator, the operator identification data comprising an identity of the operator and a level of heavy equipment training completed by the operator, the level of heavy equipment training completed by the operator indicating which of a plurality of different heavy equipment the operator is trained to operate;

verifying that the operator identification data can be registered with the heavy equipment data;

registering the identity of the operator with the heavy equipment data such that the operator is registered to operate the heavy equipment;

receiving a second set of operator identification data from the operator at a future time;

providing the operator full access to the heavy equipment in response to determining that: (i) the second set of operator identification data matches stored biometric data of a registered operator, (ii) the operator is registered under a contract identification number associated with the heavy equipment, (iii) the operator is trained to operate a type of the heavy equipment and has a training license that is valid at future time, (iv) a contractor associated with the operator is meeting contractual obligations associated with the heavy equipment, and (v) when the heavy equipment is subject to a floating contract, the contractor associated with the operator is assigned to use the heavy equipment at the future time;

providing the operator with limited access to the heavy equipment in response to determining that: (i) the second set of operator identification data matches stored biometric data of the operator, (ii) the operator is registered under the contract identification number associated with the heavy equipment, (iii) the heavy equipment is registered under the contract identification number, (iv) the operator is trained to operate the type of the heavy equipment, and (v) the training license of the operator being expired within a threshold time period before or after the future time; and providing the operator with no access in response to determining that the operator is not registered under the contract identification number associated with the heavy equipment;

wherein the operator is provided with limited access by operating the heavy equipment in a limited access mode in which one or more functionalities of the heavy equipment are disabled and the heavy equipment is operable by the operator for a first period of time; and wherein the operator is provided with emergency access by operating the heavy equipment in an emergency access mode in which the heavy equipment is drivable yet prevented from being driven up a hill or a ramp and is operable by the operator for a second period of time that is shorter than the first period of time.

18. The equipment registration system of claim 17, wherein the one or more processors are further configured to:

provide a notification to the operator indicating that the operator is provided full access to operate the heavy equipment; and unlock one or more locks on the heavy equipment that prevent operation of the heavy equipment.

19. The equipment registration system of claim 17, wherein receiving the heavy equipment data and the first set of operator identification data from the operator comprises:

receiving a contract number associated with the operation of the heavy equipment;

receiving an operator number associated with employment of the operator; and receiving a first set of facial image data of the operator; and wherein the biometric data is a second set of facial image data of the operator.

20. The equipment registration system of claim 17, wherein receiving the heavy equipment data and the first set of operator identification data from the operator comprises:

receiving the heavy equipment data and the first set of operator identification data via a mobile device of the operator.

* * * * *